US012710761B2

(12) United States Patent
Lee et al.

(10) Patent No.: US 12,710,761 B2
(45) Date of Patent: Aug. 18, 2026

(54) ELECTRONIC DEVICE FOR GENERATING A MAP AND METHOD FOR CONTROLLING THE SAME

(71) Applicant: Samsung Electronics Co., Ltd., Suwon-si (KR)

(72) Inventors: Seongoh Lee, Suwon-si (KR); Youngmin Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/750,255

(22) Filed: Jun. 21, 2024

(65) Prior Publication Data

US 2025/0004476 A1 Jan. 2, 2025

Related U.S. Application Data

(63) Continuation of application No. PCT/KR2024/004757, filed on Apr. 9, 2024.

(30) Foreign Application Priority Data

Jun. 27, 2023 (KR) ........................ 10-2023-0082830

(51) Int. Cl.
*G05D 1/246* (2024.01)
*A47L 11/40* (2006.01)
(Continued)

(52) U.S. Cl.
CPC ........ *G05D 1/2469* (2024.01); *A47L 11/4011* (2013.01); *G05D 1/2246* (2024.01);
(Continued)

(58) Field of Classification Search
CPC ............... G05D 1/2469; G05D 1/2246; G05D 2105/10; G05D 2107/40; G05D 1/2464;
(Continued)

(56) References Cited

U.S. PATENT DOCUMENTS 12,025,708 B2 7/2024 Lee et al.
2017/0131721 A1 * 5/2017 Kwak ................. G05D 1/0044
(Continued)

FOREIGN PATENT DOCUMENTS

CN 115936029 B 2/2024
EP 3460404 * 3/2019
(Continued)

OTHER PUBLICATIONS

European Search Report dated Apr. 30, 2026, issued in European Application No. 24832192.9.

*Primary Examiner* — Muhammad Shafi
(74) *Attorney, Agent, or Firm* — Jefferson IP Law, LLP

(57) ABSTRACT

An electronic device and a control method thereof are provided. The electronic device includes a communication interface, memory storing one or more computer programs, and one or more processors communicatively coupled to the communication interface and the memory. The one or more computer programs include computer-executable instructions that, when executed by the one or more processors, cause the electronic device to obtain a 2-dimensional (2D) map of an indoor space generated based on sensing data, and traveling data obtained by at least one external device, simplify the obtained 2D map, based on the traveling data, and generate a 3-dimensional (3D) map, based on the simplified 2D map.

20 Claims, 28 Drawing Sheets

(51) Int. Cl.

| | |
|---|---|
| ***G05D 1/224*** | (2024.01) |
| ***G06T 5/30*** | (2006.01) |
| ***G06T 5/70*** | (2024.01) |
| *G05D 105/10* | (2024.01) |
| *G05D 107/40* | (2024.01) |

(52) U.S. Cl.
CPC .................. *G06T 5/30* (2013.01); *G06T 5/70* (2024.01); *A47L 2201/04* (2013.01); *G05D 2105/10* (2024.01); *G05D 2107/40* (2024.01); *G06T 2200/04* (2013.01); *G06T 2200/24* (2013.01)

(58) Field of Classification Search
CPC ............. G05D 2109/10; A47L 11/4011; A47L 2201/04; G06T 5/30; G06T 5/70; G06T 2200/04; G06T 2200/24; G06T 17/05; G06T 7/13; G01C 21/206; G01C 21/383; G01C 21/3848; G01C 21/3867; G06F 3/048
USPC ............................................................ 701/25
See application file for complete search history.

(56) References Cited

U.S. PATENT DOCUMENTS

| | | | |
|---|---|---|---|
| 2018/0350216 | A1* | 12/2018 | Satkin .............. G08B 13/19639 |
| 2019/0155302 | A1 | 5/2019 | Lukierski et al. |
| 2019/0250625 | A1 | 8/2019 | Kleiner et al. |
| 2019/0311533 | A1* | 10/2019 | Doh .......................... G06T 7/70 |
| 2020/0089255 | A1 | 3/2020 | Kolling et al. |
| 2020/0249013 | A1 | 8/2020 | Zweigle et al. |
| 2021/0268652 | A1 | 9/2021 | Narayana et al. |
| 2021/0361136 | A1 | 11/2021 | Kim et al. |
| 2022/0282977 | A1 | 9/2022 | Park et al. |
| 2022/0283310 | A1 | 9/2022 | Lee et al. |
| 2023/0171410 | A1 | 6/2023 | Cui |

FOREIGN PATENT DOCUMENTS

| | | | |
|---|---|---|---|
| JP | 2019-175369 | A | 10/2019 |
| KR | 10-0757751 | B1 | 9/2007 |
| KR | 10-2257746 | B1 | 5/2021 |
| KR | 10-2022-0124051 | A | 9/2022 |
| KR | 10-2526202 | B1 | 4/2023 |
| KR | 10-2530775 | B1 | 5/2023 |
| WO | 2021/212875 | A1 | 10/2021 |

* cited by examiner

ELECTRONIC DEVICE FOR GENERATING A MAP AND METHOD FOR CONTROLLING THE SAME

CROSS-REFERENCE TO RELATED APPLICATION(S)

This application is a continuation application, claiming priority under § 365(c), of an International application No. PCT/KR2024/004757, filed on Apr. 9, 2024, which is based on and claims the benefit of a Korean patent application number 10-2023-0082830, filed on Jun. 27, 2023, in the Korean Intellectual Property Office, the disclosure of which is incorporated by reference herein in its entirety.

TECHNICAL FIELD

The disclosure relates to an electronic device for generating a map and a method for controlling the same. More particularly, the disclosure relates to an electronic device for generating a map of an indoor space in which a robot travels and a method for controlling the same.

BACKGROUND ART

Recently, in order for robots of various types (e.g., robot cleaners, serving robots, guide robots, etc.) to travel an indoor space, technology of generating a map of the indoor space is being provided.

In the related art, an area detected in a 2-dimensional (2D) map generated by a robot is set as a floor, and a 3-dimensional (3D) map is generated by erecting a wall vertically over a line recognized as a wall. At this time, because a separate simplification process of a map is not performed by an electronic device, there has been a limitation of the 3D map being displayed complicatedly and inaccurately. For example, there has been a problem of the wall being displayed complicatedly with at least one of uneven curves, with short disconnected lines, a part which is not the wall being displayed as the wall, or an inclined wall being represented in a step-type.

Accordingly, there is a need to find a method of generating a more accurate 3D map that is close to the indoor space based on the 2D map detected and generated by a robot.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device for generating a map of an indoor space in which a robot travels and a method for controlling the same.

Additional aspects will be set forth in part in the description which follows and, in part, will be apparent from the description, or may be learned by practice of the presented embodiments.

In accordance with an aspect of the disclosure, an electronic device is provided. The electronic device includes a communication interface, memory storing one or more computer programs, and one or more processors communicatively coupled to the communication interface and the memory, and the one or more computer programs include computer-executable instructions that, when executed by the one or more processors, cause the electronic device to obtain a 2-dimensional (2D) map of an indoor space generated based on sensing data, and traveling data obtained by at least one external device, simplify the obtained 2D map, based on the traveling data, and generate a 3-dimensional (3D) map, based on the simplified 2D map.

In accordance with another aspect of the disclosure, a method performed by an electronic device is provided. The method includes obtaining a 2D map of the indoor space generated based on sensing data, and traveling data obtained by at least one external device, simplifying the obtained 2D map, based on the traveling data, and generating a 3D map, based on the simplified 2D map.

In accordance with another aspect of the disclosure, one or more non-transitory computer-readable storage media storing one or more computer programs including computer-executable instructions that, when executed by one or more processors of an electronic device, cause the electronic device to perform operations are provided. The operations include obtaining a 2D map of the indoor space generated based on sensing data, and traveling data obtained by at least one external device, simplifying the obtained 2D map, based on the traveling data, and generating a 3D map, based on the simplified 2D map.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS

Figure 1:
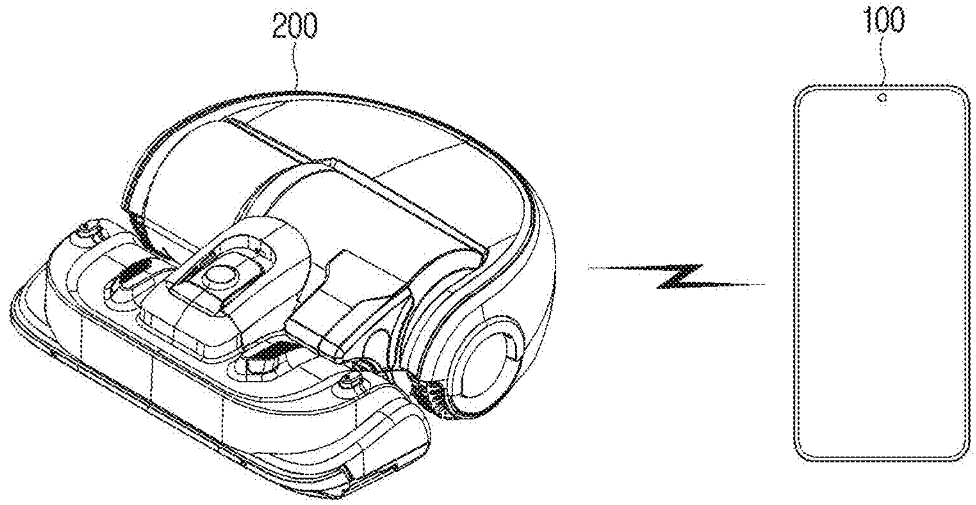
FIG. 1 is a diagram illustrating a system for generating a map of an indoor space according to an embodiment of the disclosure.

The following description with reference to the accompanying drawings is provided to assist in a comprehensive understanding various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

With respect to the description of the drawings, like reference numerals may be used to indicate like elements.

A singular form of a noun corresponding to an item may include one or a plurality of items, unless the relevant context clearly specifies otherwise.

In the disclosure, phrases such as “A or B”, “at least one of A and B”, “at least one of A or B”, “A, B, or C”, “at least one from among A, B, and C”, and “at least one from among A, B, or C” may respectively include any one from among the items listed together in the relevant phrase, or include all possible combinations thereof from among the phrases.

Terms such as “1st”, “2nd”, or “first” or “second” may be used to simply distinguish a relevant element from another relevant element, and not limited the relevant elements in other aspects (e.g., importance or order).

When a certain (e.g., first) element is indicated as being “connected with/to” or “joined to” another (e.g., second) element, together with or without terms such as “operatively” or “communicatively”, it may be understood as the certain element being connected with/to the another element directly (e.g., via wire), wirelessly, or through a third element.

Terms such as “include” or “have” are used herein to designate a presence of a characteristic, a number, a step, an operation, an element, a component, or a combination thereof, and not to preclude a presence or a possibility of adding one or more of other characteristics, numbers, steps, operations, elements, components or a combination thereof.

When a certain element is described as “connected”, “coupled”, “supported”, or “contacted” with another element, the above may include not only the elements being directly connected, coupled, supported, or contacted, but also being indirectly connected, coupled, supported, or contacted through the third element.

When the certain element is described as positioned “on” another element, the above may include not only the certain element being contacted to another element, but also other element being present between the two elements.

The term “and/or” may include a combination of a plurality of related elements described or any element from among the plurality of related elements described.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Working principles and embodiments herein will be described below with reference to the accompanied drawings.

FIG. 1 is a diagram illustrating a system for generating a map of an indoor space according to an embodiment of the disclosure. Referring to FIG. 1, a system for generating a map of an indoor space may include an electronic device 100 and a robot cleaner 200.

At this time, the electronic device 100 may be handheld by a user, or disposed at a home, an office, or the like of the user. The electronic device 100 may be a smart phone, as shown in FIG. 1, but is not limited thereto, and may be implemented as a personal computer, a terminal, a portable telephone, a handheld device, a wearable device, and the like. Alternatively, the electronic device 100 may be implemented as a separate server device.

In addition, the robot cleaner 200 may be implemented as a device capable of performing a cleaning operation while traveling the indoor space, but this is merely one embodiment, and may be implemented as a robot (e.g., serving robot, guide robot, etc.) capable of traveling the indoor space. The robot cleaner 200 may include not only the robot cleaner 200, but also a station to charge or mount the robot cleaner 200.

The robot cleaner 200 may obtain sensing data and traveling data while traveling the indoor space. Specifically, the robot cleaner 200 may obtain sensing data included with information on the indoor space in which the robot cleaner 200 travels through various sensors (e.g., a light detection and ranging (LiDAR) sensor, a time of flight (ToF) sensor, a camera, etc.), and obtain traveling data included with traveling information of the indoor space traveled by the robot cleaner 200.

The robot cleaner 200 may transmit the obtained sensing data and traveling data to the electronic device 100.

The electronic device 100 may obtain a 2-dimensional (2D) map of the indoor space based on sensing data obtained from the robot cleaner 200. At this time, the 2D map may be a map in 2D form which shows information on an indoor space, and may include a map which combined a 2D grid map, a 2D linear vector map, a 2D grid map, and a 2D linear vector, a 2D map which is newly generated using the 2D map and the 2D linear vector and displayed on a display, or the like. Specifically, the electronic device 100 may obtain a 2D grid map of an indoor space based on sensing data. At this time, the 2D grid map may be a 2D map which represents a surrounding space in a grid of an equal size and displays a presence or absence of an object (e.g., wall, obstacle, etc.) in each grid. Further, the electronic device 100 may convert the 2D grid map into a 2D linear vector map of a polyline form. At this time, the 2D linear vector map may be a 2D map which includes a linear vector in the polyline form that connects linear vector candidates extracted from a binary image.

The electronic device 100 simplifies the 2D map obtained based on traveling data. Specifically, the electronic device 100 may remove noise included in the 2D linear vector map. Further, the electronic device 100 may simplify polylines included in the 2D linear vector map in which noise is removed.

Further, the electronic device 100 may correct the 2D map based on the 2D linear vector map in which the polylines are simplified. At this time, the electronic device 100 may correct a room area included in the 2D map based on the polylines included in the 2D linear vector map.

Further, the electronic device 100 may generate a 3-dimensional (3D) map of an indoor space based on the simplified 2D linear vector map. Further, the electronic device 100 may display the 3D map of the indoor space on the display.

In addition, the electronic device 100 may display a user interface (UI) for correcting the 2D map or the 3D map according to a user input on the display, and correct the 2D map or the 3D map according to a user command input through the UI.

Meanwhile, in an embodiment of the disclosure, the electronic device 100 has been described as performing a 2D map generating operation, a 2D map simplifying operation, and a 3D map generating operation, but this is merely one embodiment, and at least a portion from among the operations described above may be implemented in the robot cleaner 200, another device (e.g., server), or the like.

As described above, by generating a 3D map by simplifying the 2D map using traveling data of the robot, a map with high visibility may be provided to the user.

Figure 2:
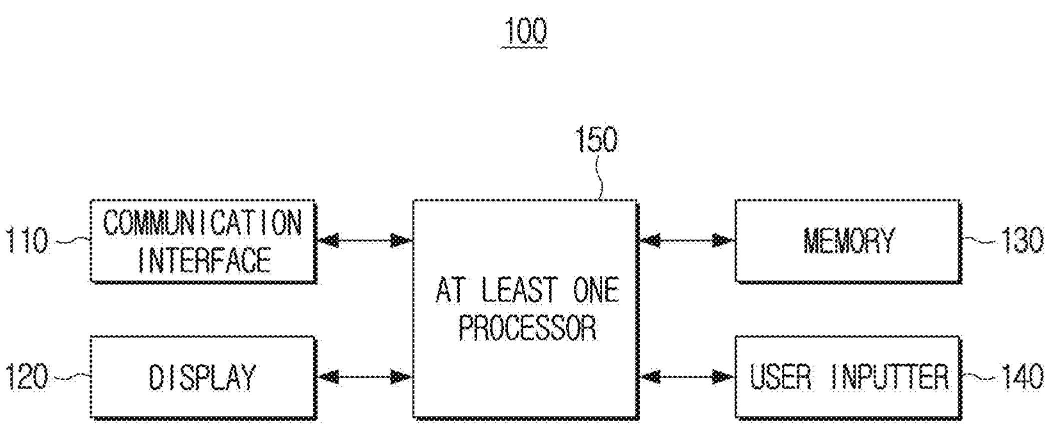
FIG. 2 is a block diagram illustrating a configuration of an electronic device according to an embodiment of the disclosure.

FIG. 2 is a block diagram illustrating a configuration of an electronic device according to an embodiment of the disclosure. Referring to FIG. 2, the electronic device 100 may include a communication interface 110, a display 120, a memory 130, a user inputter 140, and at least one processor 150. However, the above is merely one embodiment, and some configurations may be removed or added according to a type of the electronic device 100. For example, if the electronic device 100 is implemented as a set top box, the electronic device 100 may not include the display 120.

The communication interface 110 may include at least one circuitry and perform communication with an external device of various types or a server. The communication interface 110 may include at least one from among a Bluetooth low energy (BLE) module, a Wi-Fi communication module, a cellular communication module, a 3rd Generation (3G) mobile communication module, a 4th Generation (4G) mobile communication module, a 4G long term evolution (LTE) communication module, and a 5th Generation (5G) mobile communication module.

Specifically, the communication interface 110 may receive sensing data and traveling data from the robot cleaner 200. Alternatively, the communication interface 110 may receive a 2D grip map which has been generated based on sensing data and traveling data received from the cleaner 200.

Further, the communication interface 110 may transmit a control command for performing a cleaning operation to the robot cleaner 200. In addition, the communication interface 110 may receive information on the cleaning operation from the robot cleaner 200.

In one or more embodiments, the communication interface 110 may perform communication with an external server. At this time, when a user input for generating a 3D map is received after information on the 2D grid map is received from the robot cleaner 200, the communication interface 110 may transmit a signal requesting to generate a 3D map to the server. Then, the communication interface 110 may receive the 3D map from the server 1200.

In one or more embodiments, the communication interface 110 may include a module for communicating with the robot cleaner 200 and a module for communicating with the external server which are different from each other.

The display 120 may include a display panel of various types, such as, for example, and without limitation, a liquid crystal display (LCD) panel, an organic light-emitting diode (OLED) panel, an active-matrix organic light-emitting diode (AM-OLED), a liquid crystal on silicon (LcoS), a quantum dot light-emitting diode (QLED) and a digital light processing (DLP), a plasma display panel (PDP), an inorganic LED panel, a micro LED panel, or the like, but is not limited thereto. Meanwhile, the display 120 may form a touch screen together with a touch panel, and may be formed with a flexible panel.

Specifically, the display 120 may display the 2D map (e.g., 2D grid map) or the 3D map. Alternatively, the display 120 may display various UIs for simplifying or correcting the 2D map or the 3D map. The above will be described in detail below with reference to the drawings.

The memory 130 may store an operating system (OS) for controlling the overall operation of the elements of the electronic device 100 and instructions or data associated with the elements of the electronic device 100. Specifically, the memory 130 may include various modules for generating a 3D map by simplifying the 2D map. Specifically, if a function for generating a 3D map by simplifying the 2D map is executed, the electronic device 100 may load data for performing various operations by the various modules for generating a 3D map by simplifying the 2D map stored in a non-volatile memory in a volatile memory. Here, loading means an operation of loading and storing data stored in the non-volatile memory in the volatile memory for at least one processor 150 to access.

In addition, the memory 130 may store information on various neural network models and the like for generating a 3D map by simplifying the 2D map.

Meanwhile, the memory 130 may be implemented as the non-volatile memory (e.g., a hard disk, a solid state drive (SDD), a flash memory), the volatile memory (a memory within the at least one processor 150 may also be included), or the like.

The user inputter 140 may include a button, a lever, a switch, a touch-type interface, and the like. At this time, the touch-type interface may be implemented in a method capable of receiving a touch of the user on a screen of the display 120 of the electronic device 100.

Specifically, the user inputter 140 may obtain (or receive, input, etc.) a user input for generating a 3D map on the screen. Alternatively, the user inputter 140 may obtain the user input for correcting the 2D map or the 3D map. Alternatively, the user inputter 140 may obtain a user input for determining a degree of simplification of the 2D map.

The at least one processor 150 may control the electronic device 100 according to the at least one instruction stored in the memory 130.

Specifically, the at least one processor 150 may include one or more processors. Specifically, the one or more processors may include at least one from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The one or more processors may control one or a random combination from among other elements of the electronic device, and perform an operation associated with communication or data processing. The one or more processors may execute one or more programs or instructions stored in the memory. For example, the one or more processors may perform, by executing one or more instructions stored in the memory, a method according to an embodiment of the disclosure.

When a method according to an embodiment of the disclosure includes a plurality of operations, the plurality of operations may be performed by one processor, or performed by a plurality of processors. For example, when a first operation, a second operation, and a third operation are performed by a method according to an embodiment, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The one or more processors may be implemented with a single core processor that includes one core, or implemented with one or more multicore processors that include a plurality of cores (e.g., a homogeneous multicore or a heterogeneous multicore). If the one or more processors are implemented as a multicore processor, each of the plurality of cores included in the multicore processor may include a memory inside the processor such as a cache memory or an on-chip memory, and a common cache shared by the plurality of cores may be included in the multicore processor. In addition, each of the plurality of cores (or a portion from among the plurality of cores) included in the multicore processor may independently read and perform a program command for implementing a method according to an embodiment of the disclosure, or read and perform a program command for implementing a method according to an embodiment of the disclosure due to a whole (or a portion) of the plurality of cores being interconnected.

When a method according to an embodiment of the disclosure includes a plurality of operations, the plurality of operations may be performed by one core from among the plurality of cores or performed by the plurality of cores included in the multicore processor. For example, when a first operation, a second operation, and a third operation are performed by a method according to an embodiment, the first operation, the second operation, and the third operation may all be performed by a first core included in the multicore processor, or the first operation and the second operation may be performed by the first core included in the multicore processor and the third operation may be performed by a second core included in the multicore processor.

In the embodiments of the disclosure, the at least one processor 150 may mean a system on chip (SoC), a single core processor, or a multicore processor in which one or more processors and other electronic components are integrated or a core included in the single core processor or the multicore processor, and the core herein may be implemented as the CPU, the GPU, the APU, the MIC, the NPU, the hardware accelerator, the machine learning accelerator, or the like, but is not limited to the embodiments of the disclosure.

Specifically, based on the at least one processor 150 executing the at least one instruction, the electronic device 100 may obtain a 2D map of an indoor space generated based on sensing data, and traveling data obtained by at least one external device. The at least one processor 150 may simplify the obtained 2D map, based on traveling data. The at least one processor 150 may generate a 3D map, based on the simplified 2D map.

In one or more embodiments, the at least one processor 150 may obtain a 2D grid map generated based on sensing data. At this time, the at least one processor 150 may obtain a binary image, based on information on obstacles included in the 2D grid map. The at least one processor 150 may perform a thinning process of uniformly converting a thickness of a line included in the binary image. The at least one processor 150 may extract straight-line linear vector candidates from the binary image. The at least one processor 150 may obtain a 2D linear vector map by connecting the extracted straight-line linear vector candidates and converting to a linear vector.

In one or more embodiments, the at least one processor 150 may remove noise included in the 2D linear vector map. The at least one processor 150 may simplify the polylines included in the 2D linear vector map with the noise removed, based on traveling data. The at least one processor 150 may correct the room area included in the indoor space, based on the simplified 2D linear vector map.

In one or more embodiments, the at least one processor 150 may determine a line with a length of the line being less than or equal to a threshold value or a line with an irregularity being greater than or equal to the threshold value as noise from among a plurality of lines included in the 2D linear vector map.

In one or more embodiments, the at least one processor 150 may simplify the polylines included in the 2D linear vector map with the noise removed for the area traveled by the robot cleaner to be included as an indoor area, based on traveling data.

In one or more embodiments, the at least one processor 150 may delete an area that falls outside a boundary line included in the simplified 2D linear vector map from an existing room area from among room areas included in the indoor space, and add an area which is not included as the room area despite being within the boundary line included in the simplified 2D linear vector map as a new room area.

In one or more embodiments, the at least one processor 150 may display a UI asking the user about a simplification process on the display 120 during the simplification process.

In one or more embodiments, the at least one processor 150 may adjust the degree of simplification of the 2D map, based on the user input or obstacle information obtained from sensing data.

In one or more embodiments, the at least one processor 150 may determine at least one from among a form, height, and thickness of a wall included in a 3D map, based on the obstacle information obtained from the sensing data.

In one or more embodiments, the at least one processor 150 may display an editing UI for editing the 2D map or the 3D map, based on the user input.

A method of generating a 3D map by simplifying the 2D map will be described in greater detail below with reference to the drawings.

Figure 3:
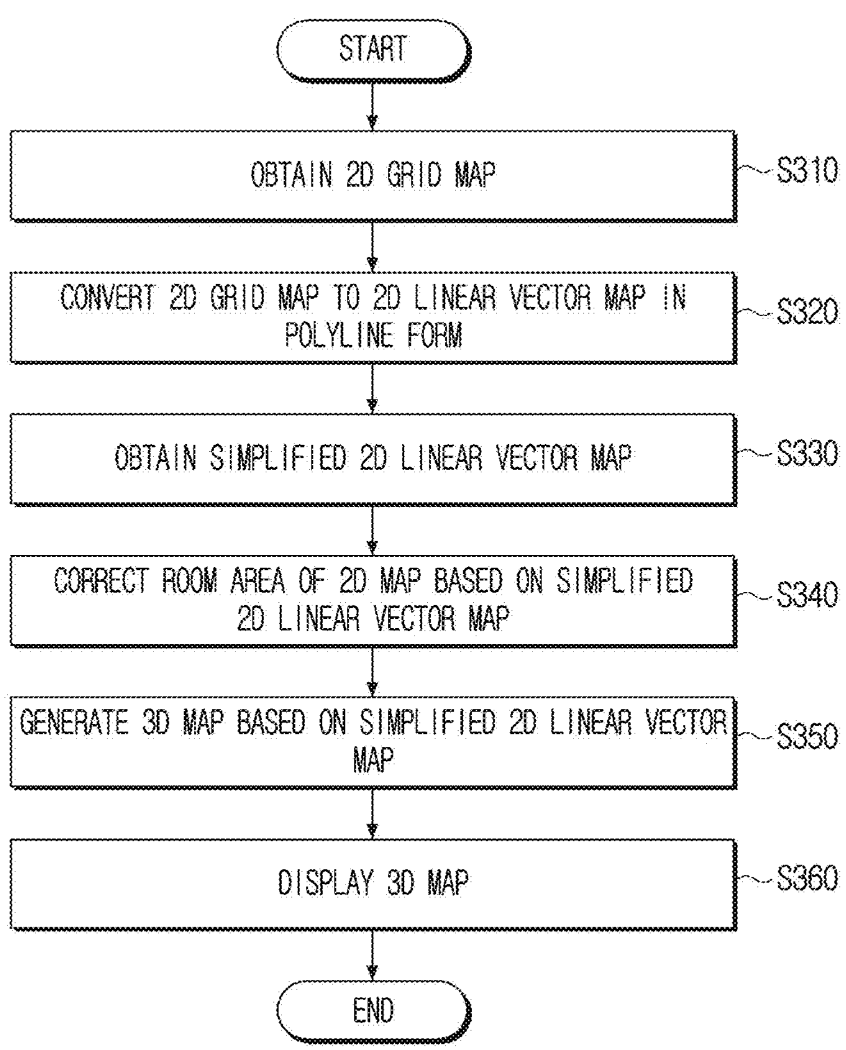
FIG. 3 is a flowchart illustrating a method of generating a 3D map by simplifying a 2D map according to an embodiment of the disclosure.

FIG. 3 is a flowchart illustrating a method of generating a 3D map by simplifying a 2D map according to an embodiment of the disclosure.

Figure 4:
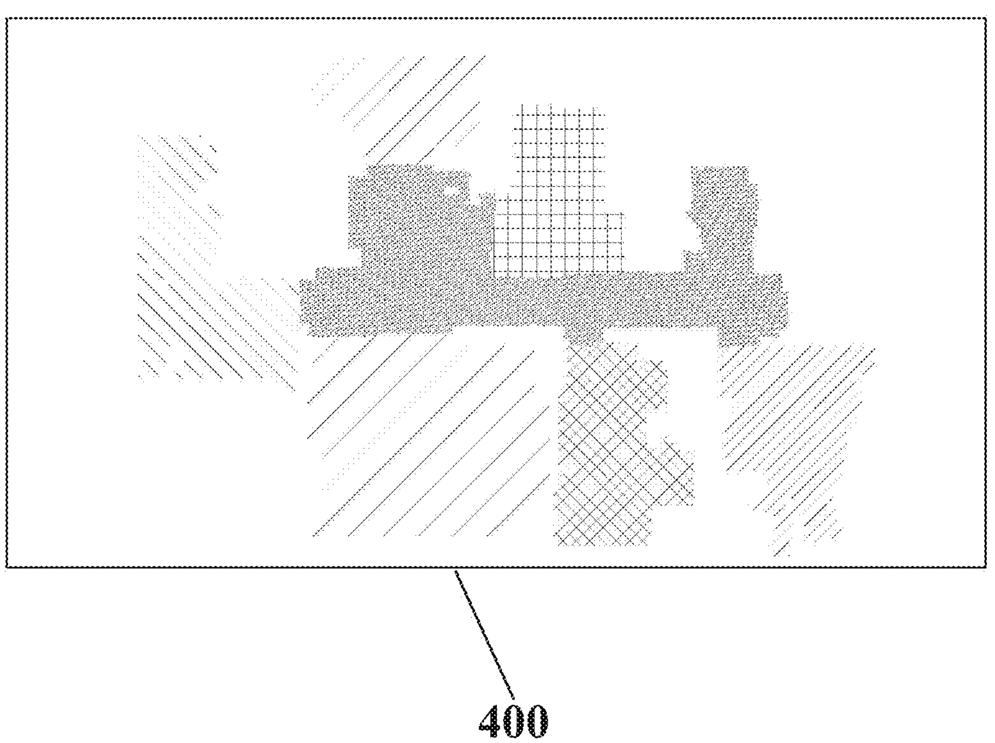
FIG. 4 is a diagram illustrating a 2D grid map according to an embodiment of the disclosure.

FIG. 4 is a diagram illustrating a 2D grid map according to an embodiment of the disclosure.

The electronic device 100 may obtain a 2D grid map 400 at operation S310. Specifically, the robot cleaner 200 may obtain sensing data through various sensors while traveling an indoor space. Specifically, the robot cleaner 200 may obtain the sensing data of the indoor space through various sensors such as a camera and a LIDAR sensor to obtain information on obstacles (e.g., object, wall, etc.). In addition, the robot cleaner 200 may obtain traveling data having traveled the indoor space through a driver. At this time, the traveling data may include a traveling route, a traveling speed, a traveling history, and the like of the robot cleaner 200 having traveled the indoor space. Further, the robot cleaner 200 may generate a 2D grid map based on the sensing data and the traveling data. At this time, a grid may include a plurality of cells, and each cell may be formed as 4 cm×4 cm. At this time, each cell may include information on a presence or absence of obstacles. In addition, the 2D grid map may be displayed by dividing the indoor space such that the areas to be divided are shown in different colors from one another. In an example, the robot cleaner 200 may generate a 2D grid map as shown in FIG. 4. Further, the robot cleaner 200 may transmit information on the 2D grid map to the electronic device 100 and thereby, the electronic device 100 may obtain the 2D grid map.

Meanwhile, in the above-described embodiment, the robot cleaner 200 has been described as collecting sensing data and traveling data, but this is merely one embodiment, and the sensing data and the traveling data may be collected by at least one external device (e.g., a camera installed outside, etc.) in addition to the robot cleaner 200.

Meanwhile, the robot cleaner 200 has been described as generating a 2D grid map, but this is merely one embodiment, and the electronic device 100 may receive sensing data and traveling data from at least one external device, and generate a 2D grid map based on the received sensing data and traveling data.

Meanwhile, the robot cleaner 200 or the electronic device 100 may generate a 2D grid map using a simultaneous localization and mapping (SLAM) technique.

FIGS. 6A, 6B, 6C and 6D are diagrams illustrating a method of converting a 2D grid map to a 2D linear vector map according to various embodiments of the disclosure.

The electronic device 100 may convert the 2D grid map to a 2D linear vector map in a polyline form at operation S320. Specifically, the electronic device 100 may obtain a 2D linear vector map by extracting a line that represents a boundary of an obstacle included in the 2D grid map. A method of the electronic device 100 converting the 2D grid map into the 2D linear vector map will be described with reference to FIGS. 5, and 6A to 6D.

Figure 5:
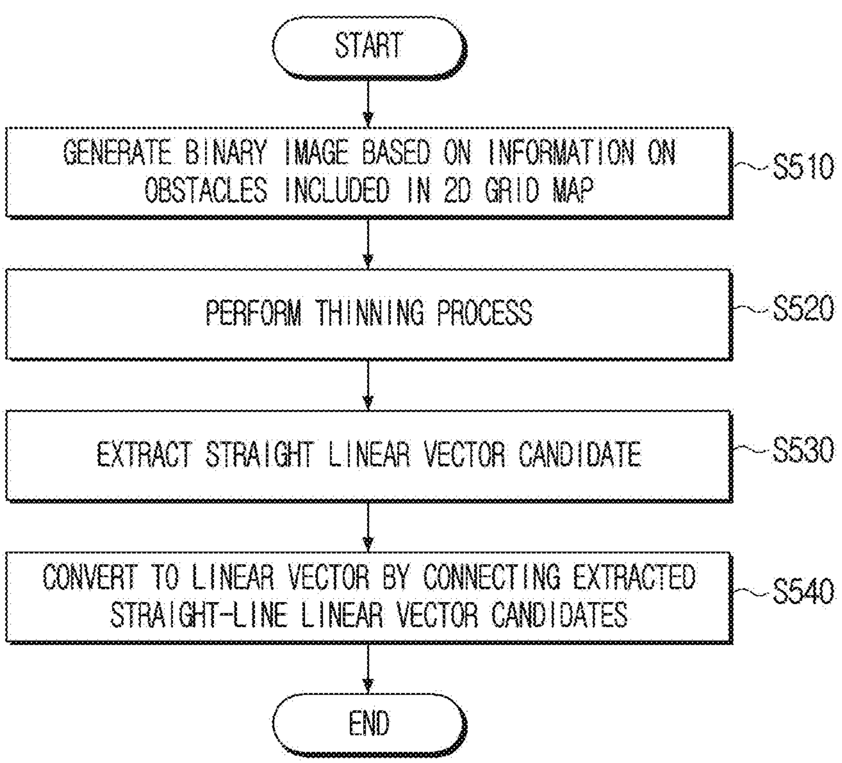
FIG. 5 is a flowchart illustrating a method of converting a 2D grid map to a 2D linear vector map according to an embodiment of the disclosure.

FIG. 5 is a flowchart illustrating a method of converting a 2D grid map to a 2D linear vector map according to an embodiment of the disclosure.

Figure 6A:
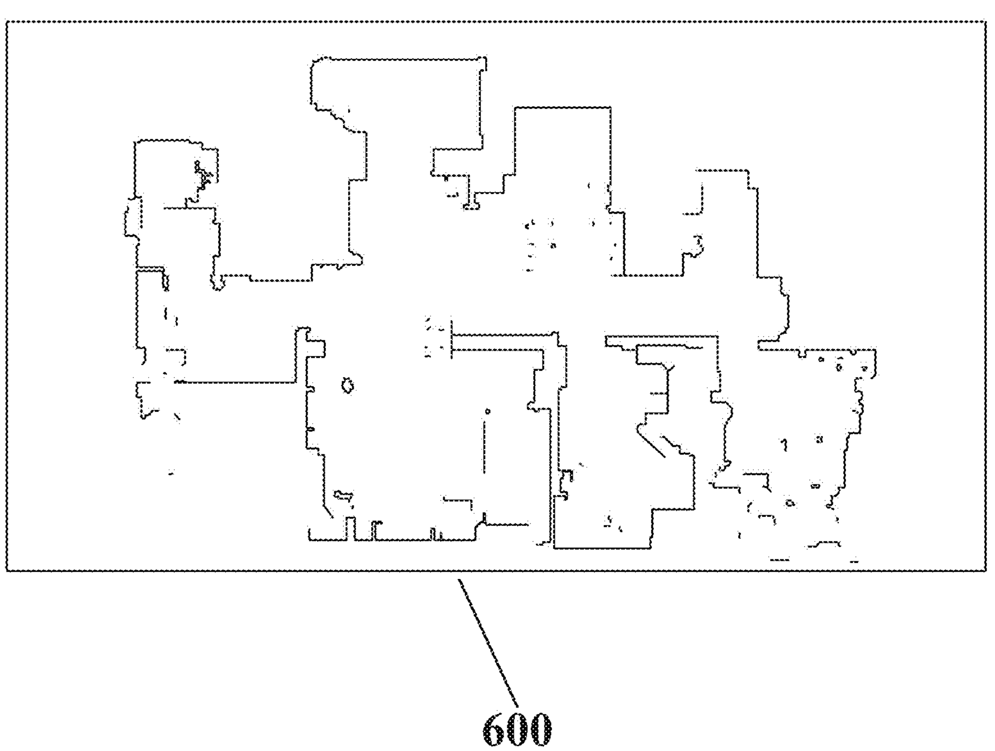
FIGS. 6A, 6B, 6C and 6D are diagrams illustrating a method of converting a 2D grid map to a 2D linear vector map according to various embodiments of the disclosure.
Figure 6B:
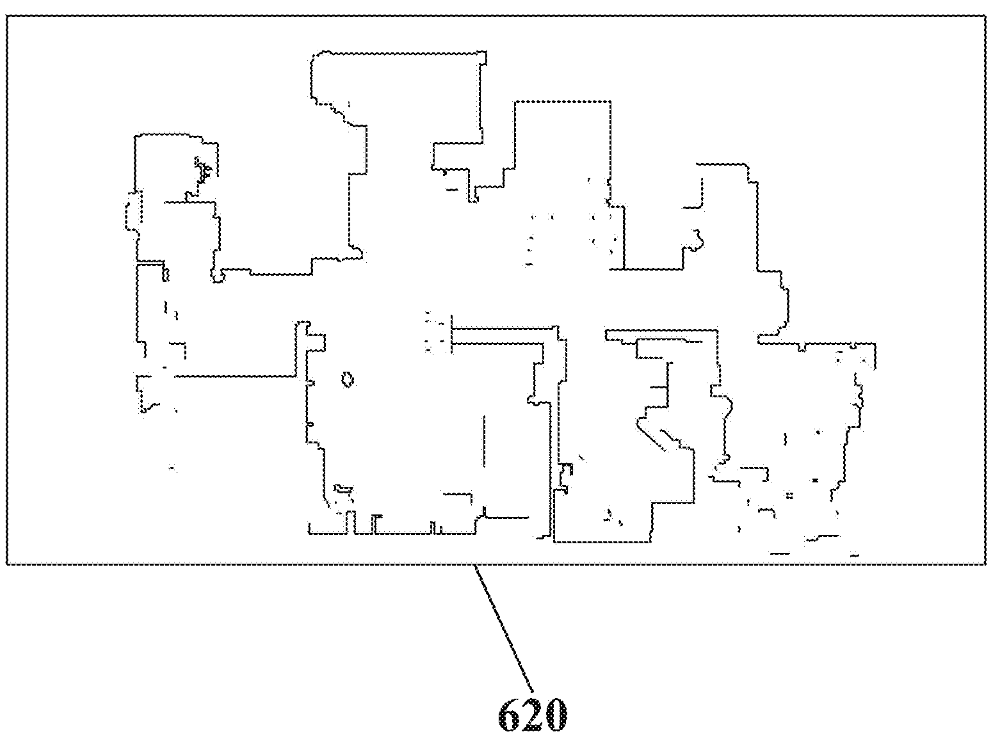
Figure 6C:
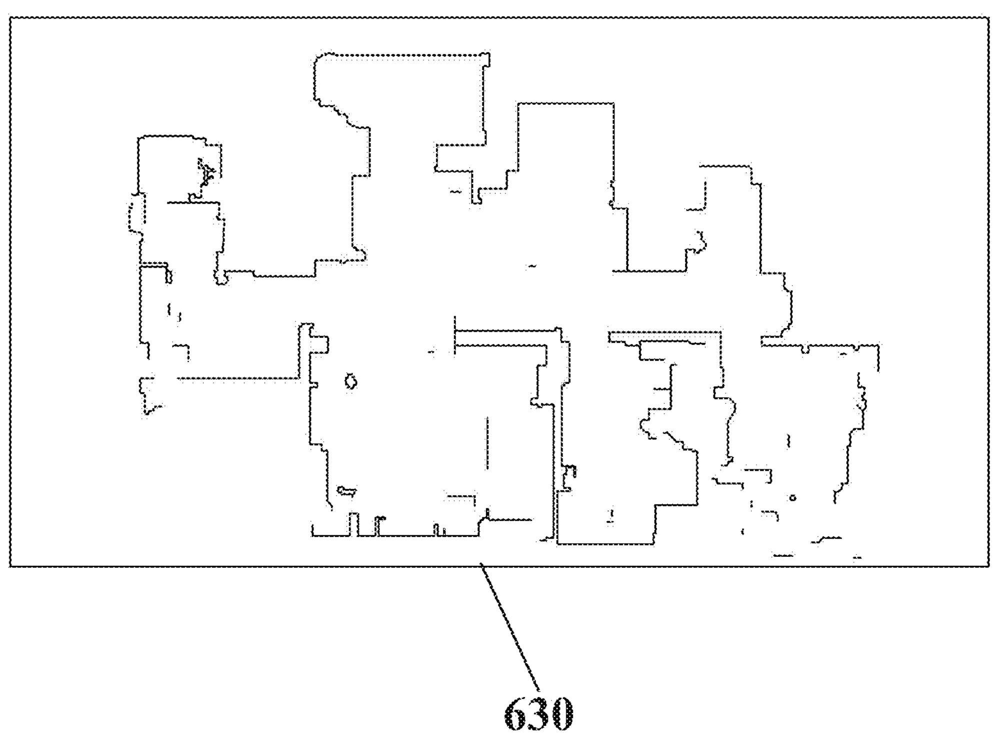
Figure 6D:
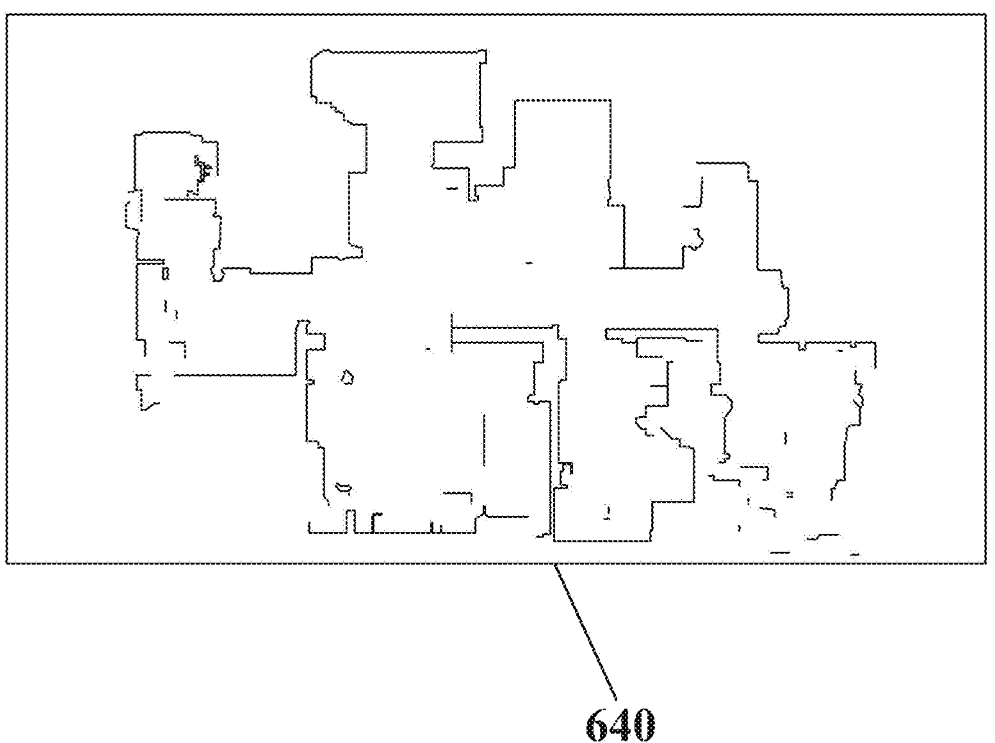

The electronic device 100 may generate a binary image based on information on obstacles included in the 2D grid map at operation S510. At this time, the binary image 600 may be an image representing the presence or absence of obstacles at positions of each pixel as shown in FIG. 6A.

The electronic device 100 may perform a thinning process of the binary image at operation S520. At this time, the thinning process may be a process of uniformly converting thicknesses of all lines included in the binary image. Specifically, if a portion of the lines have a width greater than or equal to a certain standard from among the lines representing obstacles included in the binary image, the electronic device 100 may remove an outer pixel of the portion of the lines such that a width of the portion of the lines becomes a reference width as shown in binary image 620 of FIG. 6B.

The electronic device 100 may extract the straight-line linear vector candidates from the binary image performed with the thinning processor at operation S530. Specifically, the electronic device 100 may extract the straight-line linear vector candidates, as shown in the binary image 630 of FIG. 6C, by tracking nearest neighbor pixels at which the obstacle is positioned, connecting the tracked pixels, and determining whether the connected neighbor pixels can be fitted in a straight line of greater than or equal to a certain length.

The electronic device 100 may connect the extracted straight-line linear vector candidates and convert to a linear vector in a polyline form at operation S540. Specifically, the electronic device 100 may obtain the linear vector in the polyline form, as shown in 640 of FIG. 6D, by connecting the extracted linear vector candidates. Accordingly, the electronic device 100 may obtain a 2D linear vector map which includes the linear vector in the polyline form.

Referring to FIG. 3, the electronic device 100 may obtain a simplified 2D linear vector map at operation S330. Specifically, the electronic device 100 may obtain the simplified 2D linear vector map through the simplification process of the 2D linear vector map. At this time, the simplification process may include a process of removing noise included in a map, a process of removing a protruded part of a line or connecting disconnected lines include in the map, and a process of planarizing curved parts of the line, but is not limited thereto.

FIGS. 8A, 8B, 9A, 9B, 9C, and 9D are diagrams illustrating a method of simplifying a 2D linear vector map according to various embodiments of the disclosure.

A method of simplifying the 2D linear vector map of the electronic device 100 will be described with reference to FIGS. 7, 8A, 8B, and 9A to 9D.

Figure 7:
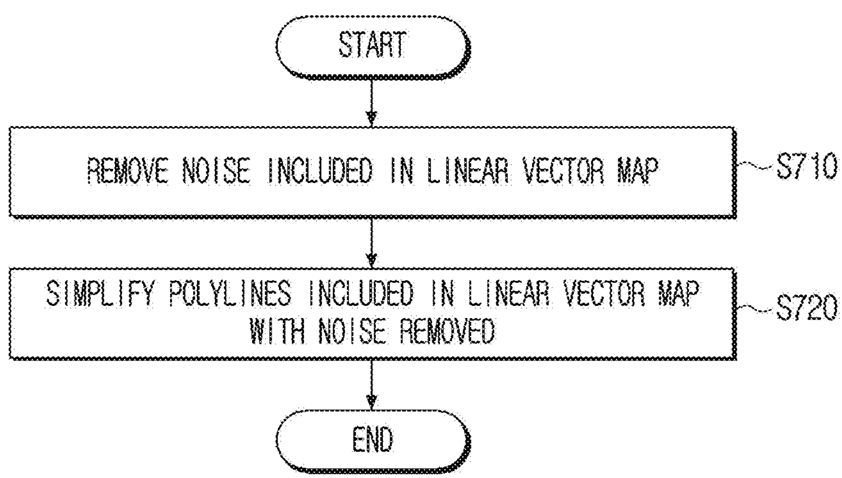
FIG. 7 is a flowchart illustrating a method of simplifying a 2D linear vector map according to an embodiment of the disclosure.

FIG. 7 is a flowchart illustrating a method of simplifying a 2D linear vector map according to an embodiment of the disclosure.

Figure 8A:
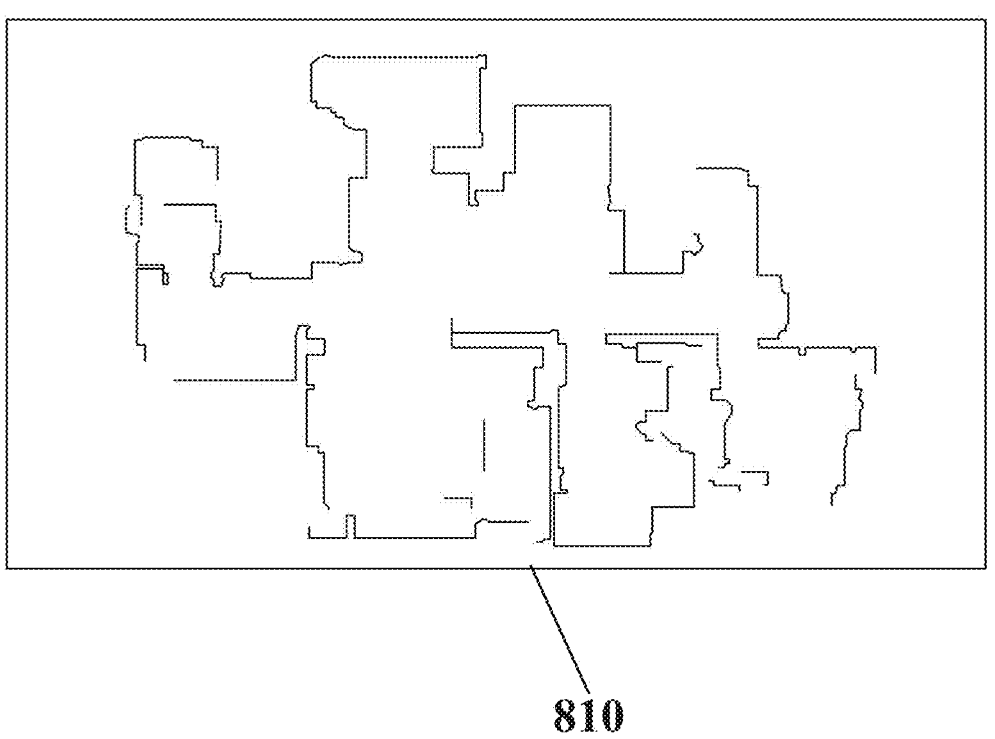
FIGS. 8A, 8B, 9A, 9B, 9C, and 9D are diagrams illustrating a method of simplifying a 2D linear vector map according to various embodiments of the disclosure.

First, the electronic device 100 may remove noise included in the 2D linear vector map at operation S710. Specifically, the electronic device 100 may identify a line determined as noise from among the plurality of lines included in the 2D linear vector map. Specifically, the electronic device 100 may determine a line with a length of the line being less than or equal to a threshold value as noise from among the plurality of lines included in the 2D linear vector map. In addition, the electronic device 100 may determine irregularities of the plurality of lines included in the 2D linear vector map. At this time, the irregularities may be irregularities of curves of a line, and may be a quantification of frequency with which a line irregularly changes direction per unit length. Further, the electronic device 100 may determine a line with an irregularity being greater than or equal to the threshold value as noise from among the plurality of lines included in the 2D linear vector map. Further, the electronic device 100 may obtain the 2D linear vector map with the noise removed 810, as shown in FIG. 8A, by removing the lines determined as noise.

Then, the electronic device 100 may simplify the polylines included in the 2D linear vector map with the noise removed at operation S720. Specifically, the electronic device 100 may simplify the 2D linear vector map by removing the protruding part of the line, connecting the disconnected lines or planarizing the curves of the line. Specifically, the electronic device 100 may simplify the polylines based on the traveling route from among traveling data received from the robot cleaner 200.

Specifically, the electronic device 100 may remove a part with a high curve irregularity between straight-lines or from a line intersecting area within the polylines included in the 2D linear vector map. For example, as shown in 910 of FIG. 9A, if a curve with a high irregularity is present between the straight-lines, the electronic device 100 may remove the curve with the high irregularity and connect the two straight lines as shown in 915 of FIG. 9A. In another example, as shown in 920 of FIG. 9B, if a curve with a high irregularity is present between an intersecting area of two straight lines, the electronic device 100 may remove the curve with the high irregularity and intersect the two straight-lines as shown in 925 of FIG. 9B.

In addition, if a curve in a diagonal-line form is present within the polylines include in the 2D linear vector map, the electronic device 100 may linearize curves in the diagonal-line form with a line fitting method or a curve fitting method. In an example, as shown in 930 of FIG. 9C, if a curve with a high irregularity is present in the diagonal-line form, the electronic device 100 may simplify as a diagonal-line as shown in 935 of FIG. 9C by using the curve fitting method.

In addition, if the irregularity of the curve at both end parts within the polylines included in the 2D linear vector map is greater than or equal to the threshold value, the electronic device 100 may remove an end part having an irregularity of greater than or equal to the threshold value.

In addition, if a distance at both end parts within the polylines included in the 2D linear vector map is close and both are vertical, the electronic device 100 may determine as a closed loop and connect both end parts.

In addition, the electronic device 100 may determine, based on the distance of two polylines included in the 2D linear vector map being less than the threshold value and both are on a same line or both are vertical, as one polyline and connect the polylines.

In addition, if a boundary line box formed of one polyline is less than or equal to the threshold value and positioned within one room area, the electronic device 100 may determine the one polyline as an object within the room and remove the same.

Figure 9A:
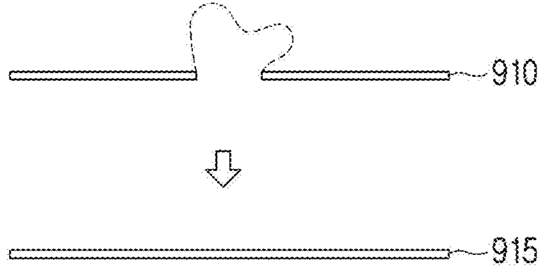
Figure 9B:
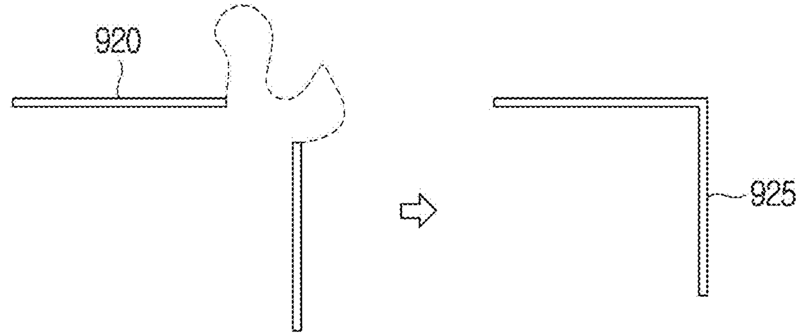
Figure 9C:
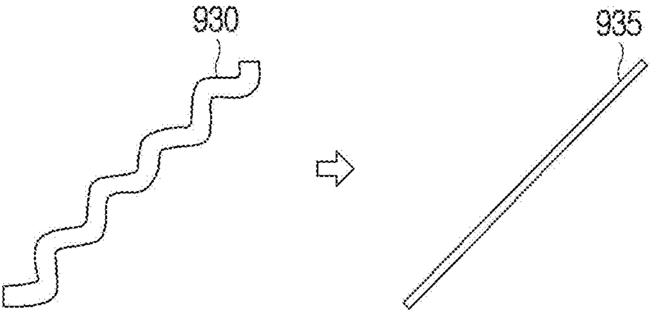
Figure 9D:
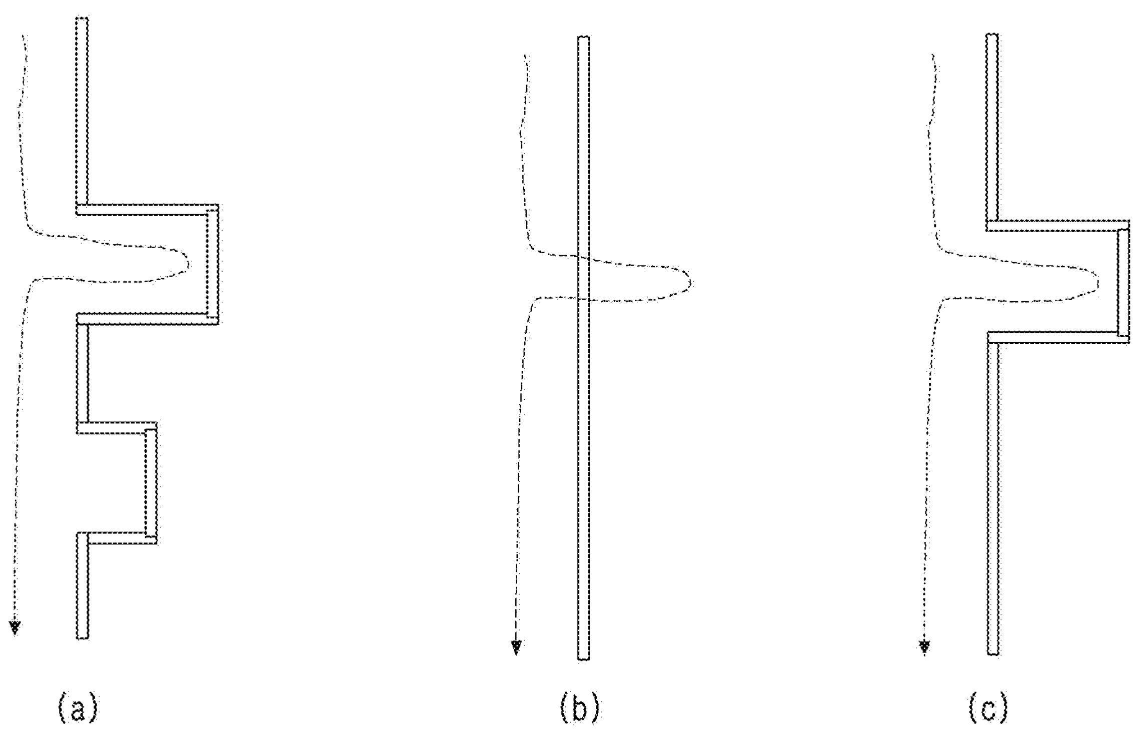

In addition, the electronic device 100 may simplify the polylines included in the 2D linear vector map based on traveling data. Specifically, the electronic device 100 may simplify the polylines included in the 2D linear vector map with the noise removed for an area traveled by the robot cleaner 200 to be included as an indoor area based on the traveling data. In an example, referring to part (a) of FIG. 9D is a diagram illustrating the 2D linear vector map prior to simplification, referring to part (b) of FIG. 9D is a diagram illustrating the 2D linear vector map which is simplified without taking into consideration the traveling data, and referring to part (c) of FIG. 9D is a diagram illustrating the 2D linear vector map which is simplified taking into consideration the traveling data. For reference, straight-lines shown in FIG. 9D may be the polylines included in the 2D linear vector map, dotted-lines may be a performing route of the robot cleaner 200

Referring to part (a) of FIG. 9D, because the 2D linear vector map which is not simplified may be included with many curves within one polyline, if a 3D map is generated using the 2D linear vector map, there may be a limit of the 3D map being complicated or an actual indoor space not being reflected. In addition, as referring to part (b) of FIG. 9D, there may be a limit of the 2D linear vector map which does not take into consideration the traveling data not reflecting an actual indoor space. Accordingly, referring to part (c) of FIG. 9D, the 2D linear vector map which takes into consideration the traveling data may have an advantage of reflecting an actual indoor space while simultaneously enhancing visibility by simplifying the 2D linear vector map for the area traveled by the robot cleaner 200 to be included as the indoor area.

Figure 8B:
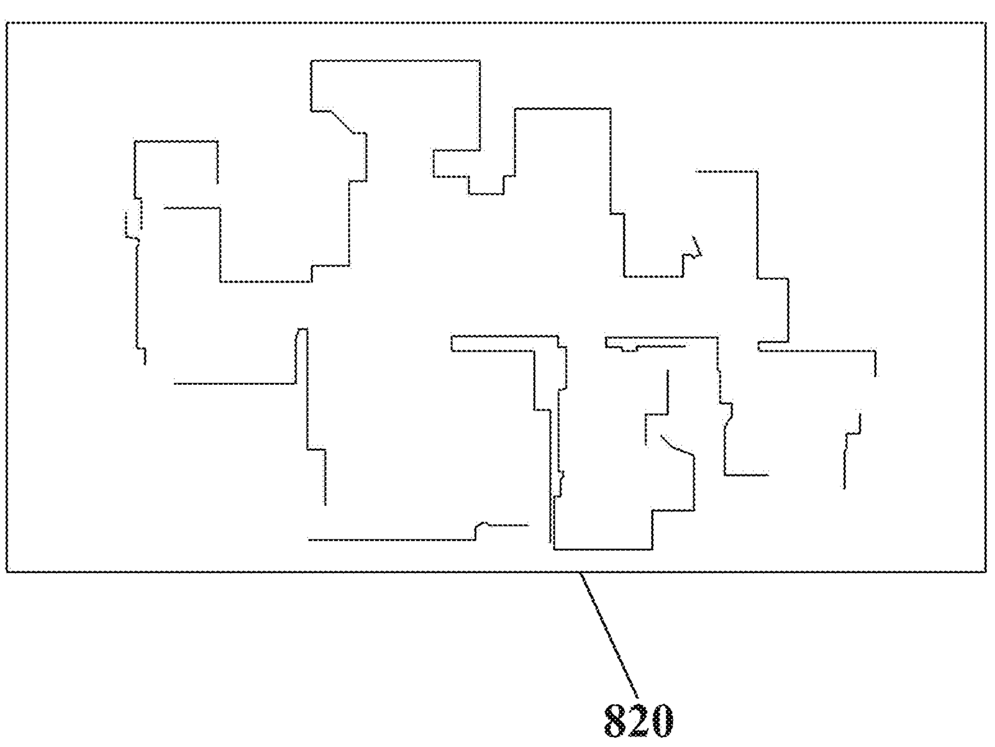

The electronic device 100 may obtain a 2D linear vector map with simplified polylines 820, as shown in FIG. 8B, through the simplification process of the 2D linear vector map as described above.

Referring back to FIG. 3, the electronic device 100 may correct a room area of the 2D map based on the simplified 2D linear vector map at operation S340.

Figure 10:
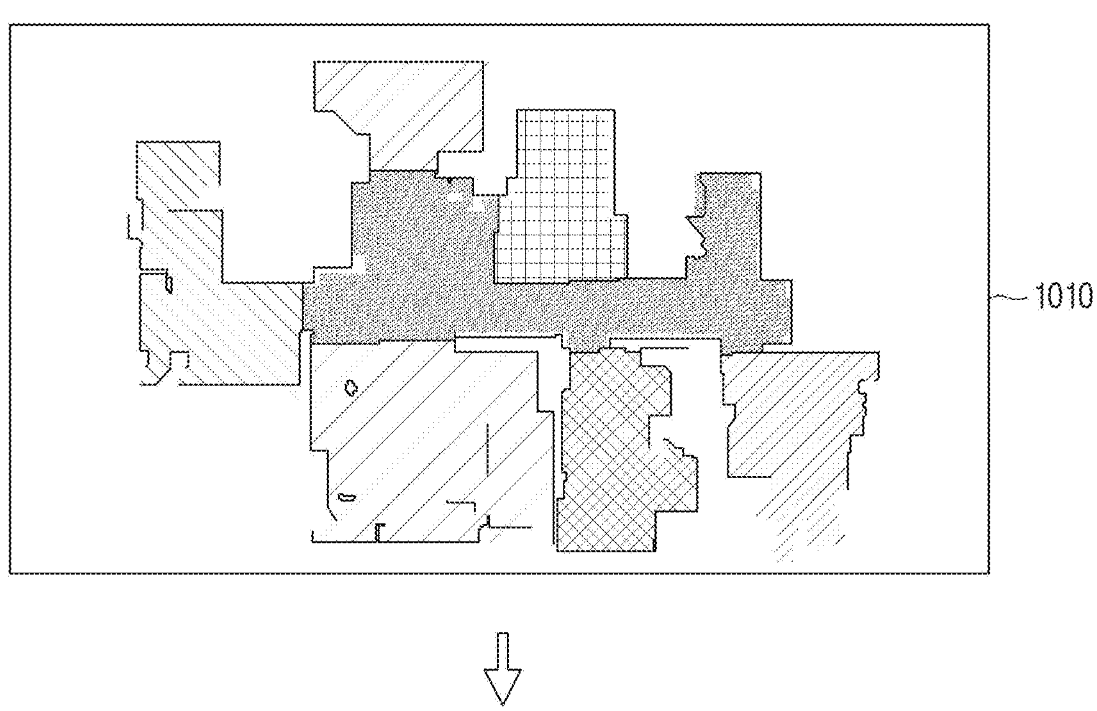
FIG. 10 is a diagram illustrating a method of correcting a room area of a 2D map according to an embodiment of the disclosure.
Figure 10:
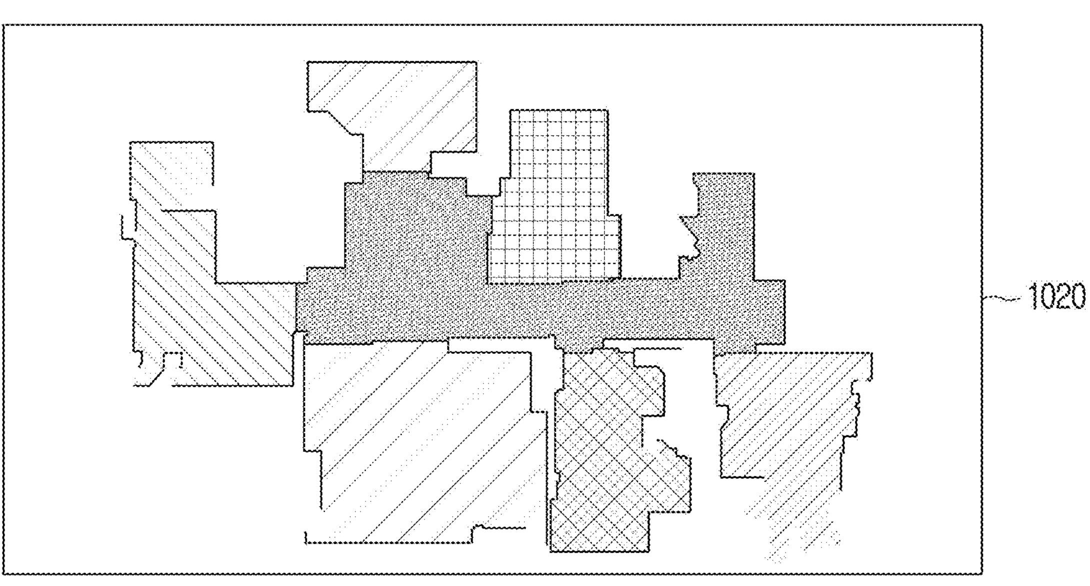

FIG. 10 is a diagram illustrating a method of correcting a room area of a 2D map according to an embodiment of the disclosure.

Specifically, the electronic device 100 may delete an area that falls outside a boundary line included in the simplified 2D linear vector map from an existing room area from among the room areas included in the 2D map (at this time, the 2D map may be a 2D map generated by the 2D grid map and the 2D linear vector map) as shown in 1010 of FIG. 10, and add an area which is not included as the room area despite being within the boundary line included in the simplified 2D linear vector map as a new room area. Accordingly, the electronic device 100 may obtain a 2D map which includes the corrected room area as shown in 1020 of FIG. 10.

Further, the electronic device 100 may generate a 3D map based on the simplified 2D linear vector map at operation S350. Specifically, the electronic device 100 may generate a wall of the 3D map based on information on obstacles included in the simplified 2D linear vector map. In addition, the electronic device 100 may generate a floor based on the 2D map with the corrected room area. Further, the electronic device 100 may generate a 3D map based on information on the previously described wall and floor.

The electronic device 100 may display the generated 3D map on the display 120 at operation S360. Specifically, the electronic device 100 may perform rendering of the 3D map and display on the display 120. Further, the electronic device 100 may receive, like the 2D map (specifically, may be a 2D map generated by the 2D grid map and the 2D linear vector map), a user input for controlling the robot cleaner 200 or other home appliances using the 3D map, and provide information on a cleaning result.

Figure 11:
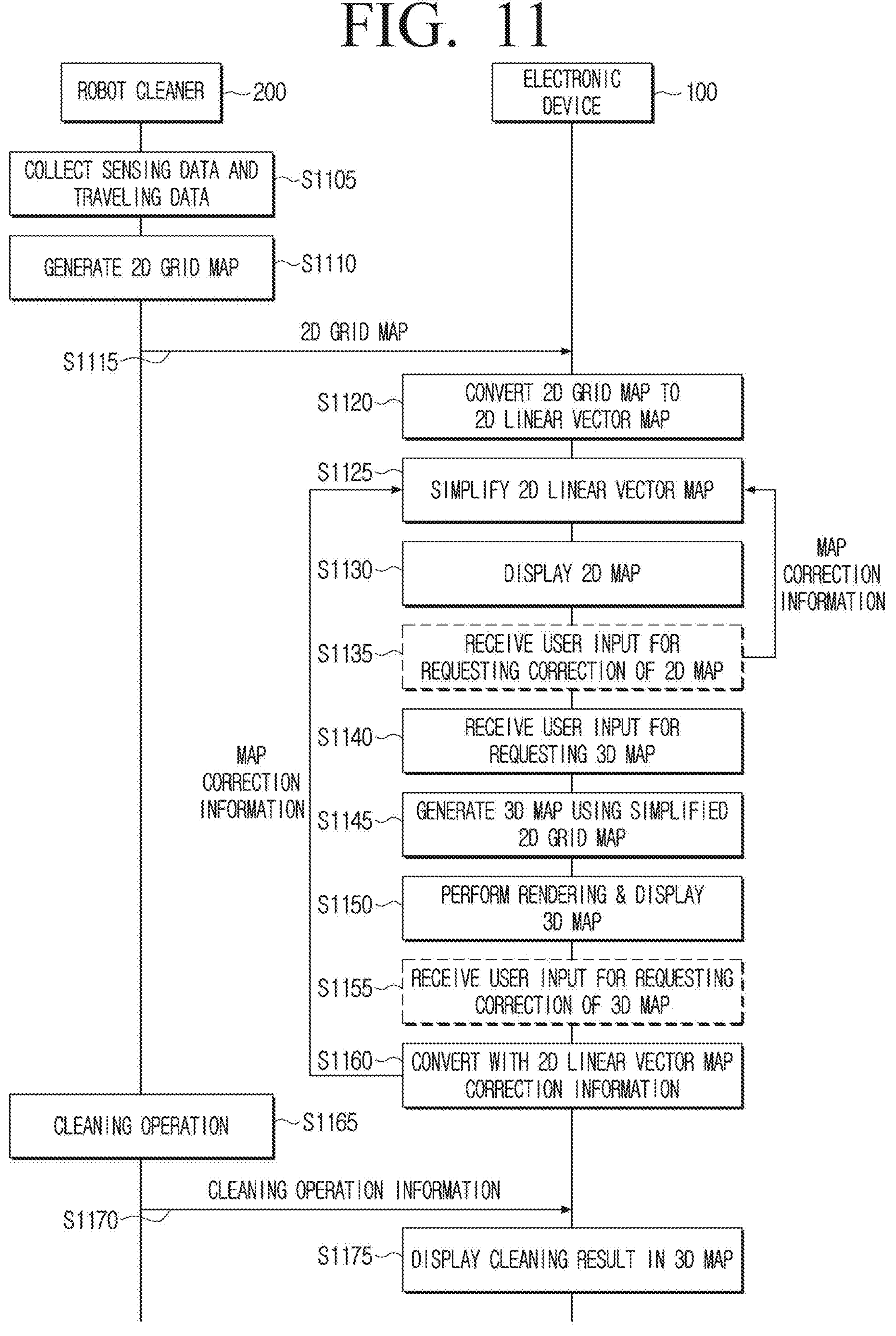
FIG. 11 is a sequence diagram for correcting a method of correcting a 2D map or a 3D map according to an embodiment of the disclosure.

FIG. 11 is a sequence diagram for correcting a method of correcting a 2D map or a 3D map according to an embodiment of the disclosure.

First, the robot cleaner 200 may collect sensing data and traveling data while traveling an indoor space at operation S1105.

The robot cleaner 200 may generate a 2D grid map based on the collected sensing data and traveling data at operation S1110. At this time, the robot cleaner 200 may generate the 2D grid map using the SLAM technique.

Then, the robot cleaner 200 may transmit information on the 2D grid map to the electronic device 100 at operation S1115.

The electronic device 100 may convert the 2D grid map to a 2D linear vector map at operation S1120. At this time, the electronic device 100 may convert the 2D grid map to the 2D linear vector map which includes a linear vector in polyline form in the same method as described in FIGS. 5, and 6A to 6D.

The electronic device 100 may simplify the 2D linear vector map at operation S1125. At this time, the electronic device 100 may obtain the 2D linear vector map which includes the simplified polylines through the same method as described in FIGS. 7, 8A, 8B, and 9A to 9D. At this time, the electronic device 100 may correct the room area of the 2D map based on the simplified 2D linear vector map.

The electronic device 100 may display the corrected 2D map through the simplified 2D linear vector map at operation S1130. At this time, the 2D map may be a map generated based on the 2D grid map and the 2D linear vector map.

Meanwhile, the electronic device 100 may receive a user input for requesting correction of the 2D map at operation S1135. If the user input for requesting the correction of the 2D map is received, the electronic device 100 may simplify the 2D linear vector map again based on map correction information.

The electronic device 100 may receive a user input for requesting a 3D map at operation S1140.

The electronic device 100 may generate the 3D map using the simplified 2D linear vector map at operation S1145.

The electronic device 100 may perform rendering of the 3D map and display on the display 120 at operation S1150. The electronic device 100 may control the robot cleaner 200 according to the input user input or display the cleaning result on the displayed 3D map.

Meanwhile, the electronic device 100 may receive a user input for requesting correction of the 3D map at operation S1155. If the user input for requesting the correction of the 3D map is received, the electronic device 100 may convert to the map correction information of the 2D map based on the user input for requesting correction of the 3D map at operation s1160. Further at operation S1160, the electronic device 100 may simplify the 2D linear vector map again based on the map correction information of the 2D map. The electronic device 100 may generate the 3D map again based on the simplified 2D linear vector map. However, the above-described embodiment is merely one embodiment, and the electronic device 100 may obtain map correction information of the 3D map, and correct the 3D map immediately based on the obtained map correction information.

Meanwhile, the robot cleaner 200 may perform a cleaning operation according to the user input or a pre-set period at operation S1165. At this time, the robot cleaner 200 may perform the cleaning operation based on the generated 2D grid map, and update the 2D grid map based on the cleaning operation result.

The robot cleaner 200 may transmit information on the cleaning operation to the electronic device 100 at operation S1170. At this time, the information on the cleaning operation may include an area, a traveling route, a cleaning time, obstacle information, and the like of the robot cleaner 200 having performed the cleaning operation while the cleaning operation is performed.

The electronic device 100 may display the cleaning result in the 3D map at operation S1175. For example, the electronic device 100 may display information on the area in which the cleaning operation is performed, information on the traveling route, information on the cleaning time, obstacle information, and the like on the 3D map.

Meanwhile, in the above-described embodiment, the electronic device 100 has been described as generating the 3D map by simplifying the 2D map, but this is merely one embodiment, and may generate the 3D map by simplifying the 2D map through a separate server. The above will be described with reference to FIG. 12.

Figure 12:
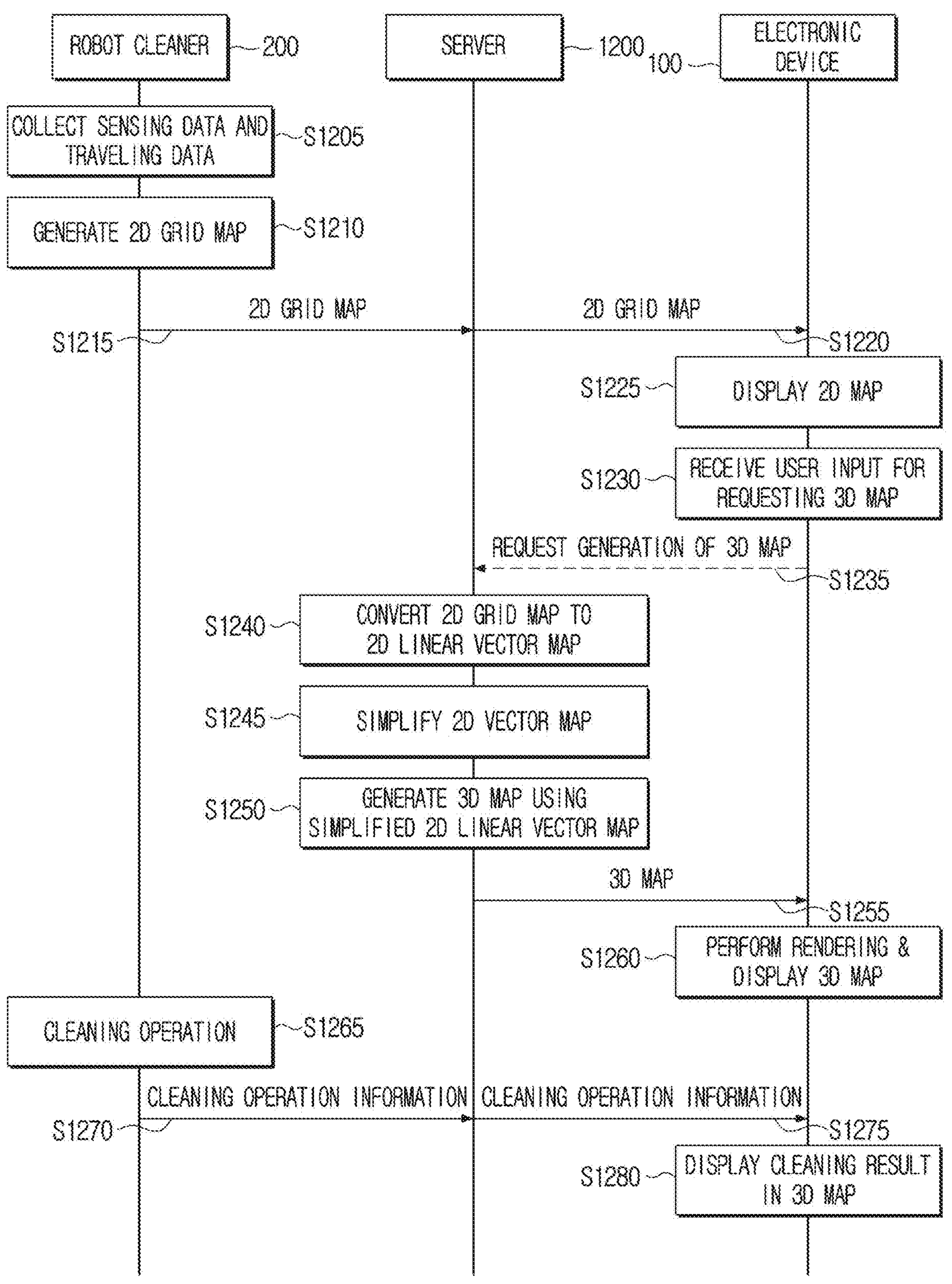
FIG. 12 is a sequence diagram illustrating a method of generating a map of an indoor space by a system which includes a server for generating a map of the indoor space according to an embodiment of the disclosure.

FIG. 12 is a sequence diagram illustrating a method of generating a map of an indoor space by a system which includes a server for generating a map of the indoor space according to an embodiment of the disclosure.

First, the robot cleaner 200 may collect sensing data and traveling data while traveling an indoor space at operation S1205.

The robot cleaner 200 may generate a 2D grid map based on the collected sensing data and traveling data at operation S1210. At this time, the robot cleaner 200 may generate the 2D grid map using the SLAM technique.

Then, the robot cleaner 200 may transmit information on the 2D grid map to a server 1200 at operation S1215, and the server 1200 may transmit the information on the 2D grid map to the electronic device 100 at operation S1220. Meanwhile, the robot cleaner 200 may transmit the information on the 2D grid map to the electronic device 100 through the server 1200, but this is merely one embodiment, and transmit the information on the 2D grid map directly to the electronic device 100.

The electronic device 100 may display the 2D map at operation S1225. At this time, the displayed 2D map may be a 2D map generated by the 2D grid map and the 2D linear vector map. Then, the electronic device 100 may receive a user input for requesting a 3D map at operation S1230.

The electronic device 100 may transmit a signal for requesting the generation of the 3D map to the server 1200 in response to the user input at operation S1235.

The server 1200 may convert the 2D grid map to the 2D linear vector map at operation S1240. At this time, the server 1200 may convert the 2D grid map to the 2D linear vector map which includes the linear vector in polyline form in the same method as described in FIGS. 5, and 6A to 6D.

The server 1200 may simplify the 2D linear vector map at operation S1245. At this time, the server 1200 may obtain the 2D linear vector map which includes the simplified polylines through the method as described in FIGS. 7, 8A, 8B, and 9A to 9D. At this time, the server 1200 may correct a room area of the 2D map through the simplified 2D linear vector map.

The server 1200 may generate a 3D map using the simplified 2D linear vector map at operation S1250.

The server 1200 may transmit the 3D map generated using the simplified 2D grid map to the electronic device 100 at operation S1255.

The electronic device 100 may perform rendering of the 3D map and display on the display 120 at operation S1260. The electronic device 100 may control the robot cleaner 200 according to the input user input or display the cleaning result on the displayed 3D map.

The robot cleaner 200 may perform the cleaning operation according to the user input or the pre-set period at operation S1265. At this time, the robot cleaner 200 may perform the cleaning operation based on the generated 2D grid map, and update the 2D grid map based on the cleaning operation result.

The robot cleaner 200 may transmit the information on the cleaning operation to the server 1200 at operation S1270, and the server 1200 may transmit the information on the cleaning operation to the electronic device 100 at operation S1275. At this time, the robot cleaner 200 may transmit the information on the cleaning operation to the electronic device 100 through the server 1200, but this is merely one embodiment, and transmit the information on the cleaning operation directly to the electronic device 100.

The electronic device 100 may display the cleaning result in the 3D map at operation S1280. For example, the electronic device 100 may display information on the area in which the cleaning operation is performed, information on the traveling route, information of the cleaning time, obstacle information, and the like on the 3D map.

Meanwhile, in FIG. 12, the 3D map has been described as being generated by simplifying the 2D map through the server 1200, but this is merely one embodiment, and the 3D map may be generated by simplifying the 2D map in the robot cleaner itself. At this time, the robot cleaner 200 may generate the 3D map by simplifying the 2D map through not only a main body of the robot cleaner 200, but also through a station included with the robot cleaner 200.

Meanwhile, in one or more embodiments, the electronic device 100 may adjust the degree of simplification of the 2D map based on the user input or obstacle information obtained from sensing data. Specifically, if the degree of simplification is set at a high value, the electronic device 100 may perform the simplification process to remove noise or for parts where the curves are planarized within the polylines to increase. If the degree of simplification is set at a low value, the electronic device 100 may perform the simplification process to remove noise or for parts where the curves are planarized within the polylines to decrease. Accordingly, if the degree of simplification is at a high value, the electronic device 100 may perform the simplification process for the 2D map or the 3D map to have a relatively more simple form, and if the degree of simplification is at a low value, the electronic device 100 may perform the simplification process for the 2D map or the 3D map to have a relatively complex form. At this time, the electronic device 100 may adjust the degree of simplification by adjusting a threshold value for removing noise, and a threshold value for determining an irregularity, FIG. 13 is a diagram illustrating a user interface (UI) for selecting a degree of simplification of a 2D map according to an embodiment of the disclosure.

Figure 13:
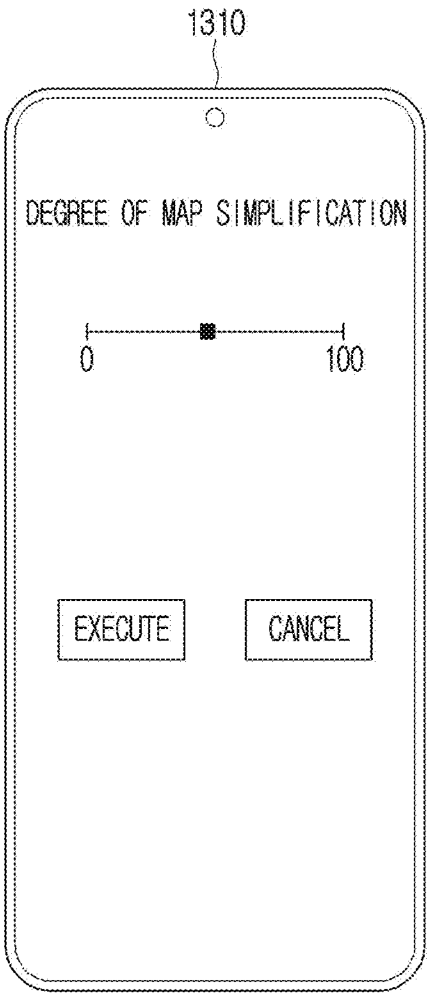
FIG. 13 is a diagram illustrating a user interface (UI) for selecting a degree of simplification of a 2D map according to an embodiment of the disclosure.

In one or more embodiments, the electronic device 100 may adjust the degree of simplification of the 2D map based on a user input which is input through a UI 1310 as shown in FIG. 13. For example, the electronic device 100 may adjust the degree of simplification of the 2D map based on a user input for adjusting a progress bar included in the UI 1310. At this time, if the user input of setting the degree of simplification at a high value is received, the electronic device 100 may perform the simplification process to remove noise or for the parts where the curves are planarized within the polylines to increase. If the user input of setting the degree of simplification at a low value is received, the electronic device 100 may perform the simplification process to remove noise or for the parts where the curves are planarized within the polylines to decrease. Meanwhile, in FIG. 13, the UI 1310 for adjusting the degree of simplification using the progress bar is shown, but this is merely one embodiment, and the degree of simplification may be adjusted through a UI including other UI elements (e.g., icons for selecting the degree of simplification (e.g., high, medium, low, etc.)).

In one or more embodiments, the electronic device 100 may adjust the degree of simplification of the 2D map based on obstacle information obtained from sensing data. Specifically, the electronic device 100 may identify whether obstacles greater than or equal to a threshold value are present in the indoor space or sizes of the obstacles therein based on the sensing data. If obstacles greater than or equal to the threshold value are present in the indoor space or if obstacles smaller than a threshold size are present by greater than or equal to the threshold value, the electronic device 100 may set the degree of simplification to a low value to raise a degree of precision. Based on the above, the electronic device 100 may prevent the obstacle from being simplified and omitted, and may represent an edge-line of the obstacle with more detail. If the obstacles are present by less than or equal to the threshold value in the indoor space or if the obstacles smaller than the threshold size are present by less than or equal to the threshold value, The electronic device 100 may set the degree of simplification to a high value.

In one or more embodiments, the degree of simplification may be set differently for each room area divided by the 2D map and not the whole indoor space. For example, a room area with many obstacles (e.g., a storage area) may be set such that the degree of simplification has a low value, and a room with little obstacles (e.g. a living room area) may be set such that the degree of simplification has a high value.

In one or more embodiments, the electronic device 100 may identify, when generating a 3D map through the 2D map, a form, height, width, and the like of a wall which is generated taking into consideration obstacle information obtained when the robot cleaner 200 travels the indoor space rather than generating a wall of a same height and width collectively. For example, the 2D grid map may be generated to include information (e.g., a form, width, or height) of an obstacle at a relevant position rather than representing the presence or absence of obstacles in binary data. Based on the above, the electronic device 100 may identify, when generating a wall in the 3D map, the form, height, and width of the wall included in the 3D map based on information on the obstacles included in the 2D grid map. Alternatively, the electronic device 100 may additionally generate a separate grid map which includes the form, width, or height information of obstacles together with the 2D grid map which represents the presence or absence of obstacles. Further, the electronic device 100 may identify the form, height, and width of the wall included in the 3D map by using the 2D grid map and the separate grid map.

In one or more embodiments, if the robot cleaner 200 recognizes a type of obstacle through the camera or another sensor, the electronic device 100 may determine the form of the wall or the obstacle generated in the 3D map using the recognized obstacle information. For example, the sensing data collected by the robot cleaner 200 may be input in a trained neural network model and the type of obstacle may be recognized. Then, the electronic device 100 may insert the recognized obstacle in the 3D map based on the recognized type of obstacle.

Figure 14A:
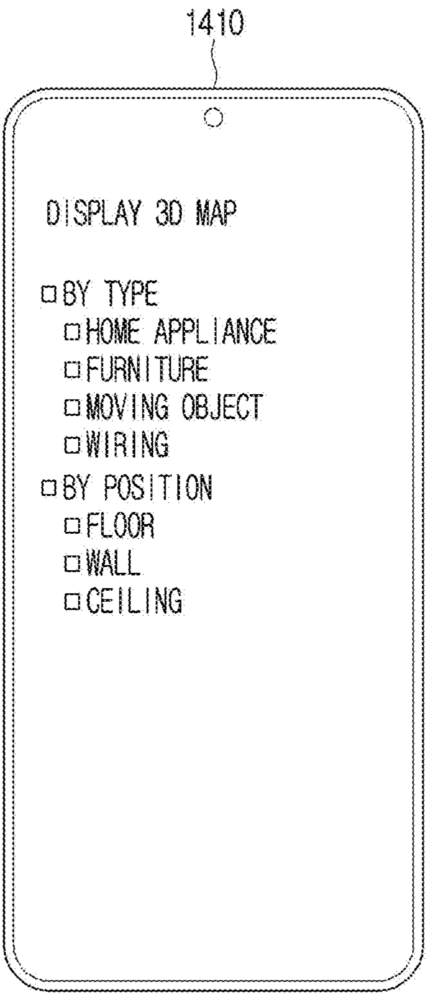
FIGS. 14A, 14B, and 14C are diagrams illustrating a UI for selecting a type of obstacle included in a 3D map and a 3D map according to various embodiments of the disclosure.
Figure 14B:
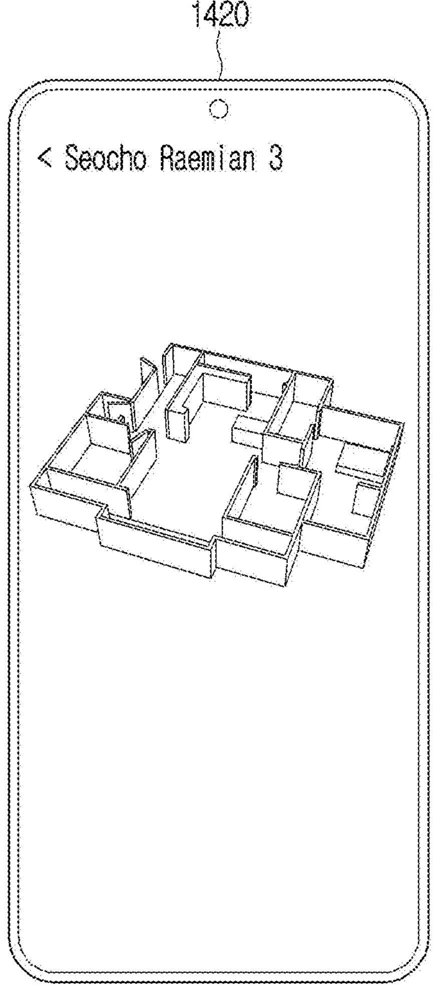
Figure 14C:
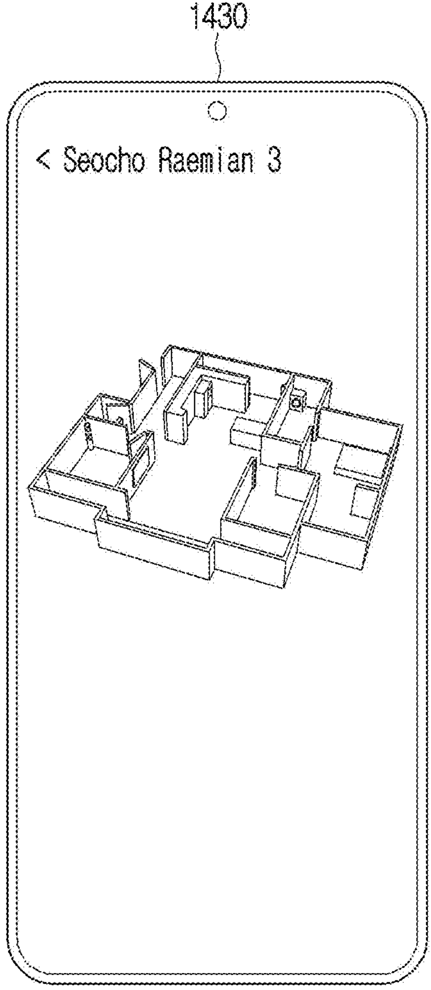

FIGS. 14A, 14B, and 14C are diagrams illustrating a UI for selecting a type of obstacle included in a 3D map and a 3D map according to various embodiments of the disclosure.

At this time, the electronic device 100 may display a UI for selecting the type of obstacle to be included in the 3D map on the display 120. For example, the electronic device 100 may display, as shown in FIG. 14A, a UI 1410 for determining the type or position of the obstacle to be included in the 3D map on the display 120. If the type of obstacle is not selected through the UI 1410, the electronic device 100 may generate a 3D map 1420 so as to not include an obstacle other than the wall as shown in FIG. 14B. However, if a home appliance is selected as the type of obstacle through the UI 1410, the electronic device 100 may generate a 3D Map 1430 to include the home appliance as shown in FIG. 14C. In another example, if a floor is selected through the UI 1410, the electronic device 100 may generate a 3D map to include an obstacle positioned on the floor.

Based on the above, as the electronic device 100 is able to provide a different 3D map to include only the type of obstacle desired by the user, the user may be provided with various services. For example, the electronic device 100 may receive a user command for controlling the home appliance through the 3D map which includes the home appliance. In another example, the electronic device 100 may perform a cleaning operation more efficiently through the 3D map which includes the obstacle positioned on the floor.

In one or more embodiments, the electronic device 100 may display an editing UI for editing a 2D map or a 3D map based on a user input on the display 120. Specifically, if the user views the map (the 2D map or the 3D map) completed by the electronic device 100 and inputs map correction information for an additional map correction, the electronic device 100 may perform a correction process and a simplification process of the 2D map based on the map correction information, and display the generated 2D map on the display 120. The user may check the simplified 2D map displayed on the display 120 and perform the simplification process repeatedly. In addition, if the user inputs the map correction information of the 3D map, the electronic device 100 may perform the correction process and the simplification process by changing the correction information of the 3D map to the correction information of the 2D map.

Figure 15A:
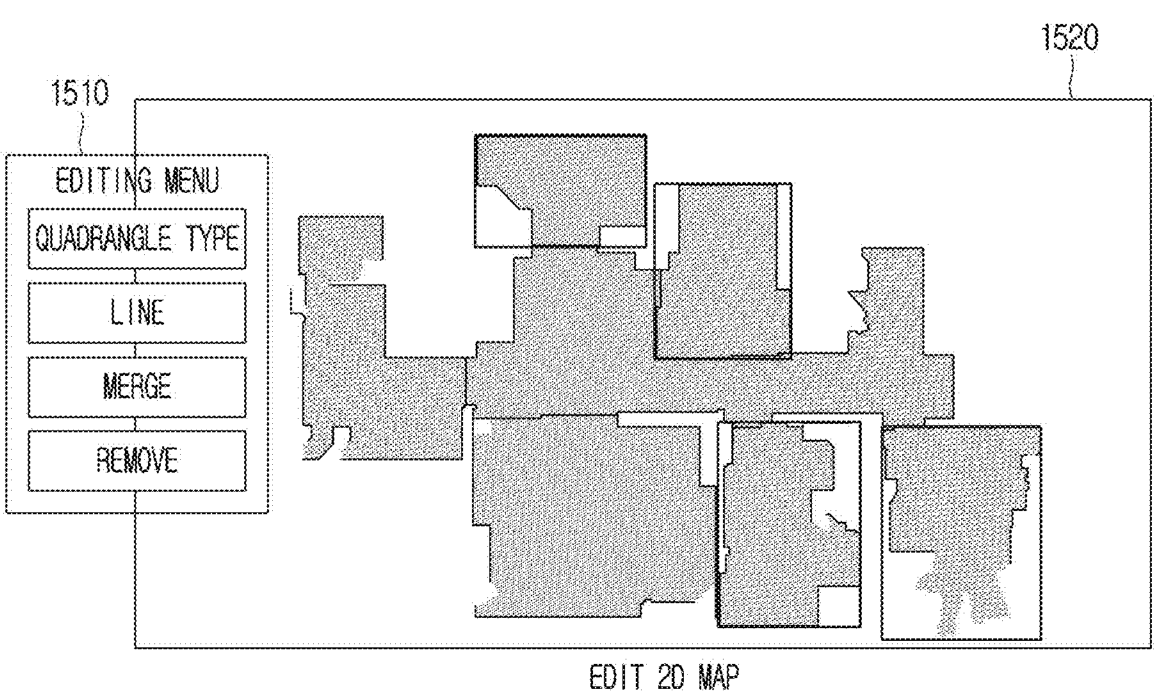
FIGS. 15A, 15B, and 15C are diagrams illustrating a UI for correcting a 2D map or a 3D map according to various embodiments of the disclosure.
Figure 15B:
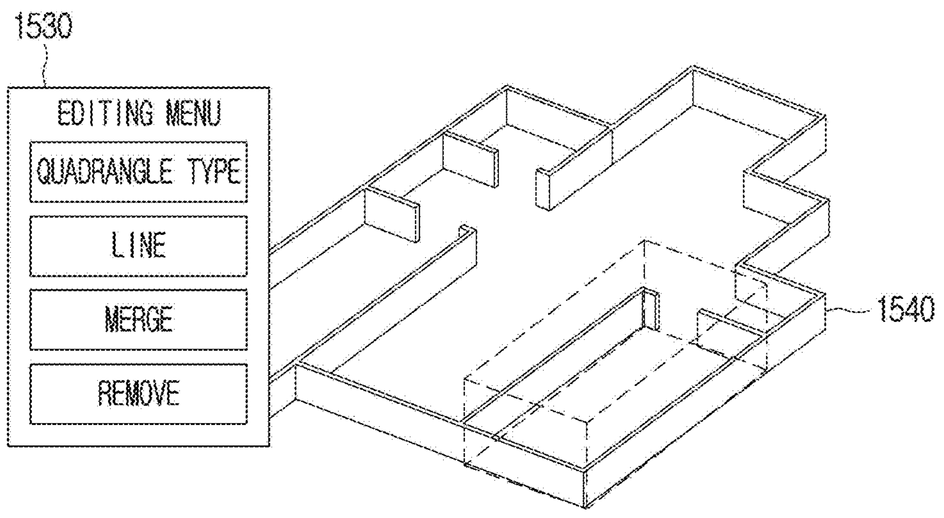
Figure 15C:
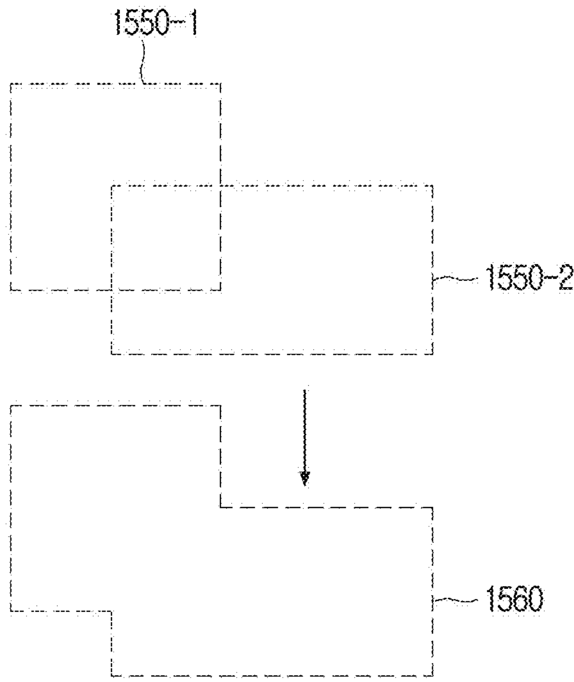

FIGS. 15A, 15B, and 15C are diagrams illustrating a UI for correcting a 2D map or a 3D map according to various embodiments of the disclosure.

FIG. 15A is a diagram illustrating a UI for correcting a 2D map according to an embodiment of the disclosure. At this time, the electronic device 100 may display an editing UI 1510 for correcting the 2D map and a 2D map 1520 on the display 120.

At this time, if a user input for drawing a quadrangle corresponding to a room area is received through a quadrangle menu included on the editing UI 1510, the electronic device 100 may display the room area on the 2D map 1520 in a quadrangle form as shown in FIG. 15A. At this time, if the room area is not horizontal, the electronic device 100 may rotate the quadrangle representing the room area through the user input.

Alternatively, if a user input for merging the quadrangle is received through a merge menu included on the editing UI 1510, the electronic device 100 may merge two quadrangles and display a room area in one polygonal form. For example, as shown in FIG. 15C, the electronic device 100 may display a room area in polygonal form 1560 through a command merging a first quadrangle 1550-1 and a second quadrangle 1550-2.

In addition, if a user input for drawing a wall is received through a line drawing menu included on the editing UI 1510, the electronic device 100 may correct the 2D map for the wall corresponding to the line to be included. At this time, if the wall is not horizontal, the electronic device 100 may rotate the line through the user input.

In addition, if a user input for removing a room or a line is received through a remove menu included on the editing UI 1510, the electronic device 100 may remove the room or the line based on the user input.

FIG. 15B is a diagram illustrating a UI for correcting a 3D map according to an embodiment of the disclosure. At this time, the electronic device 100 may display an editing UI 1530 for correcting the 3D map and a 3D map 1540 on the display 120.

Correction of the 3D map shown in FIG. 15B may be same as that described in FIG. 15A, but a height of a quadrangle and a height/width of a line may be set through the user input. The electronic device 100 may correct the height/width of the wall included in the indoor space through the set height/width of the quadrangle and the line.

Referring to FIGS. 15A to 15C, if the map correction information is obtained through the editing UI, the electronic device 100 may correct the 2D map based on the obtained map correction information, and perform the simplification process.

Specifically, the electronic device 100 may perform the simplification process by first connecting vectors which match with the map correction information from among the linear vectors extracted from the 2D grid map. Then, the electronic device 100 may remove vectors which do not match with the map correction information by determining as an obstacle or noise. The electronic device 100 may perform the simplification process by searching a similar pattern even if the map correction information does not accurately match with the linear vector.

Figure 16:
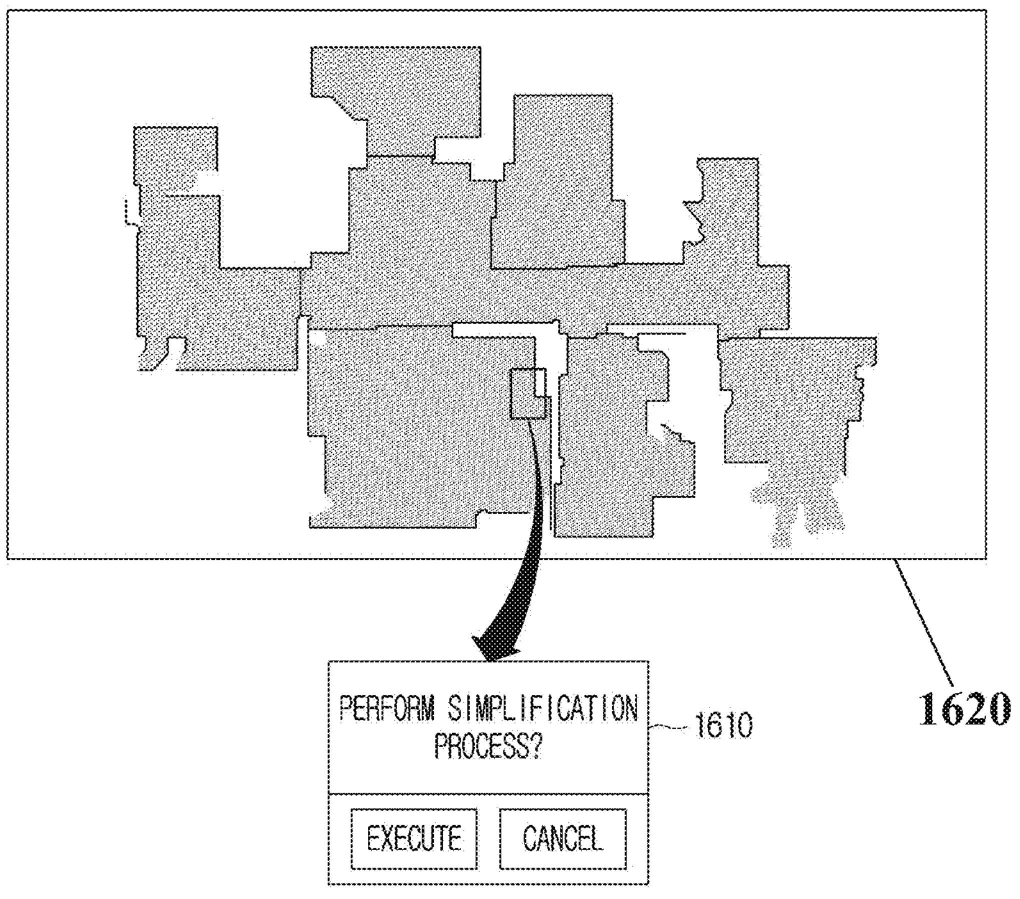
FIG. 16 is a diagram illustrating a UI questioning whether to perform a simplification process of some areas from among a plurality of areas included in a 2D map according to an embodiment of the disclosure.

FIG. 16 is a diagram illustrating a UI questioning whether to perform a simplification process of some areas from among a plurality of areas included in a 2D map according to an embodiment of the disclosure.

In one or more embodiments, the electronic device 100 may display a UI asking about the simplification process to the user when carrying out the simplification process on the display 120. In an embodiment, the electronic device 100 may display a UI 1610 asking whether to perform the simplification process on one area included in the 2D map 1620 as shown in FIG. 16. At this time, the one area may be an area in which whether to perform the simplification process is ambiguous. For example, if a length of a line included in the polylines is determined as within a threshold range or if the irregularity is determined as within the threshold range, the electronic device 100 may display a UI asking whether to perform the simplification process on the one area. If the user input for performing the simplification process is received through the UI 1610, the electronic device 100 may perform the simplification process on the one area, and if the user input for not performing the simplification process is received through the UI 1610, the electronic device 100 may not perform the simplification process on the one area.

In one or more embodiments, the electronic device 100 may perform the simplification process when the robot cleaner 200 generates an initial map, but this is merely one embodiment, and the electronic device 10 may perform the simplification process based on a user input, a pre-set period, or a pre-set event. In an example, if the user input for performing the simplification process is received, the electronic device 100 may perform the simplification process based on the user input. In another example, the electronic device 100 may perform the simplification process based on the pre-set period (e.g., 1 month) or the pre-set event (e.g., adding of a home appliance or changing of furniture arrangement, etc.)

Figure 17:
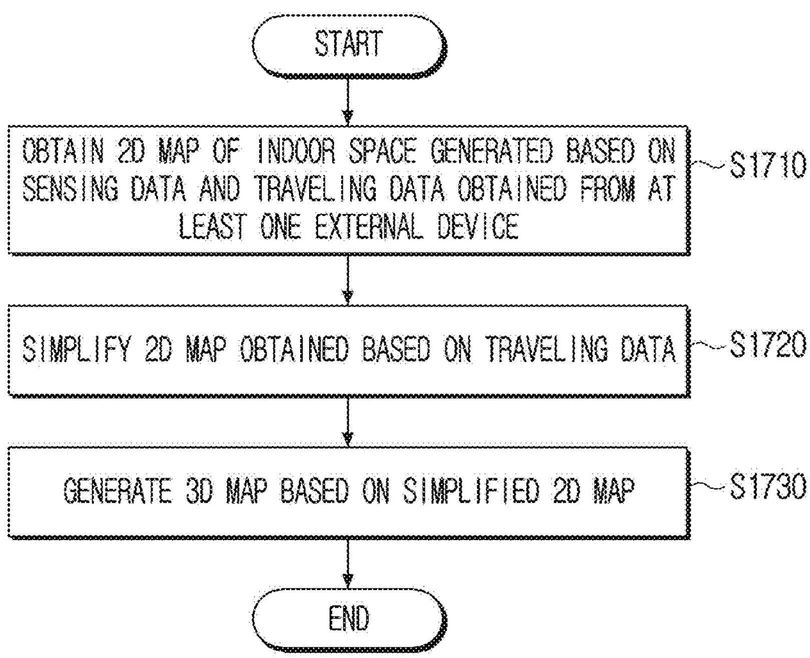
FIG. 17 is a diagram illustrating a control method of an electronic device for generating a map according to an embodiment of the disclosure.

FIG. 17 is a diagram illustrating a control method of an electronic device for generating a map according to an embodiment of the disclosure.

The electronic device 100 may obtain a 2D map of an indoor space generated based on sensing data and traveling data obtained by at least one external device at operation S1710. At this time, the electronic device 100 may directly generate the 2D map based on the sensing data and the traveling data, but this is merely one embodiment, and may receive the 2D map generated by the external device (the robot cleaner 200 or the external server 1200).

The electronic device 100 may simplify the 2D map obtained based on the traveling data at operation S1720. Specifically, the electronic device 100 may obtain a 2D grid map generated based on the sensing data. The electronic device 100 may obtain a binary image based on information on obstacles included in the 2D grid map. The electronic device 100 may perform the thinning process of uniformly converting the thickness of the line included in the binary image. The electronic device 100 may extract the straight-line linear vector candidates from the binary image. The electronic device 100 may obtain a 2D linear vector map by connecting the extracted straight-line linear vector candidates and converting to a linear vector.

Further, the electronic device 100 may remove noise included in the 2D linear vector map. The electronic device 100 may simplify the polylines included in the 2D linear vector map with the noise removed based on the traveling data. The electronic device 100 may correct the room area included in the indoor space based on the simplified 2D linear vector map.

At this time, the electronic device 100 may determine a line with a length of the line being less than or equal to the threshold value or a line with an irregularity being greater than or equal to the threshold value as noise from among the plurality of lines included in the 2D linear vector map and remove the same.

In addition, the electronic device 100 may simplify the polylines included in the 2D linear vector map with the noise removed for the area traveled by the robot cleaner to be included as the indoor area based on the traveling data.

In addition, the electronic device 100 may delete an area that falls outside the boundary line included in the simplified 2D linear vector map from an existing room area from among the room areas included in the indoor space, and add an area which is not included as the room area despite being within the boundary line included in the simplified 2D linear vector map as a new room area.

The electronic device 100 may generate the 3D map based on the simplified 2D map at operation S1730. Then, the electronic device 100 may perform rendering of the generated 3D map and display one the display 120. Based on the above, the user may control various home appliances included in the indoor space through the 3D map, and check the cleaning operation.

Meanwhile, the electronic device 100 may display a UI asking the user about the simplification process during the simplification process. In addition, the electronic device 100 may adjust the degree of simplification of the 2D map based on the user input or the obstacle information obtained from the sensing data. In addition, the electronic device 100 may determine at least one from among the form, height, and thickness of the wall included in the 3D map based on the obstacle information obtained from the sensing data. In addition, the electronic device 100 may display the editing UI for editing the 2D map or the 3D map based on the user input.

Meanwhile, a method according to the various embodiments of the disclosure may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™) or directly between two user devices (e.g., smartphones). In the case of online distribution, at least a portion of the computer program product (e.g., downloadable app) may be stored at least temporarily in the storage medium readable by a machine such as a server of a manufacturer, a server of an application store, or a memory of a relay server, or temporarily generated.

The method according to the various embodiments of the disclosure may be implemented with software including instructions stored in a machine-readable storage media (e.g., computer). The machine may call an instruction stored in the storage medium, and as a device operable according to the called instruction, may include an electronic device according to the above-mentioned embodiments.

Meanwhile, the machine-readable storage medium may be provided in the form of a non-transitory storage medium. Herein, 'non-transitory' merely means that the storage medium is a tangible device, and does not include a signal (e.g., electromagnetic waves), and the term does not differentiate data being semi-permanently stored or temporarily stored in the storage medium. In an example, the 'non-transitory storage medium' may include a buffer in which data is temporarily stored.

Based on an instruction being executed by the processor, the processor may directly or using other elements under the control of the processor perform a function corresponding to the command. The command may include a code generated by a compiler or executed by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:

a communication interface;

memory storing one or more computer programs; and one or more processors communicatively coupled to the communication interface and the memory, wherein the one or more computer programs include computer-executable instructions that, when executed by the one or more processors, cause the electronic device to:

obtain a 2-dimensional (2D) map of an indoor space generated based on sensing data, and traveling data obtained by at least one external device, simplify the obtained 2D map, based on the traveling data, and generate a 3-dimensional (3D) map, based on the simplified 2D map, and wherein the obtaining of the 2D map comprises:

obtaining a 2D grid map based on the sensing data, obtaining a binary image based on information on obstacles included in the 2D grid map, and obtaining, as the 2D map, a 2D linear vector map based on the binary image.

2. The electronic device of claim 1, wherein the obtaining of the 2D map comprises:

performing a thinning process of uniformly converting a thickness of a line included in the binary image;

extracting straight-line linear vector candidates from the binary image; and obtaining the 2D linear vector map by connecting the extracted straight-line linear vector candidates and converting to a linear vector.

3. The electronic device of claim 2, wherein the one or more computer programs further include computer-executable instructions that, when executed by the one or more processors, cause the electronic device to:

remove noise included in the 2D linear vector map;

simplify polylines included in the 2D linear vector map with the noise removed, based on the traveling data; and correct a room area included in the indoor space, based on the simplified 2D linear vector map.

4. The electronic device of claim 3, wherein the one or more computer programs further include computer-executable instructions that, when executed by the one or more processors, cause the electronic device to:

determine a line with a length of the line being less than or equal to a threshold value or a line with an irregularity being greater than or equal to the threshold value as noise from among a plurality of lines included in the 2D linear vector map.

5. The electronic device of claim 3, wherein the one or more computer programs further include computer-executable instructions that, when executed by the one or more processors, cause the electronic device to:

simplify polylines included in the 2D linear vector map with the noise removed for an area traveled by a robot cleaner to be included as an indoor area, based on the traveling data.

6. The electronic device of claim 3, wherein the one or more computer programs further include computer-executable instructions that, when executed by the one or more processors, cause the electronic device to:

delete an area that falls outside a boundary line included in the simplified 2D linear vector map from an existing room area from among room areas included in the indoor space; and add an area which is not included as the room area despite being within the boundary line included in the simplified 2D linear vector map as a new room area.

7. The electronic device of claim 3, further comprising:

a display, wherein the one or more computer programs further include computer-executable instructions that, when executed by the one or more processors, cause the electronic device to:

display a user interface (UI) asking a user about performing simplification during a simplification process on the display.

8. The electronic device of claim 1, wherein the one or more computer programs further include computer-executable instructions that, when executed by the one or more processors, cause the electronic device to:

adjust a degree of simplification of the 2D map, based on a user input or obstacle information obtained from the sensing data.

9. The electronic device of claim 1, wherein the one or more computer programs further include computer-executable instructions that, when executed by the one or more processors, cause the electronic device to:

determine at least one from among a form, a height, and a thickness of a wall included in the 3D map, based on obstacle information obtained from the sensing data.

10. The electronic device of claim 1, further comprising:

a display, wherein the one or more computer programs further include computer-executable instructions that, when executed by the one or more processors, cause the electronic device to display an editing user interface (UI) for editing the 2D map or the 3D map, based on a user input on the display.

11. A method performed by an electronic device, the method comprising:

obtaining, by the electronic device, a 2-dimensional (2D) map of an indoor space generated based on sensing data, and traveling data obtained by at least one external device;

simplifying, by the electronic device, the obtained 2D map, based on the traveling data; and generating, by the electronic device, a 3-dimensional (3D) map, based on the simplified 2D map, wherein the obtaining of the 2D map comprises:

obtaining a 2D grid map based on the sensing data, obtaining a binary image based on information on obstacles included in the 2D grid map, and obtaining, as the 2D map, a 2D linear vector map based on the binary image.

12. The method of claim 11, wherein the obtaining of the 2D map comprises:

performing a thinning process of uniformly converting a thickness of a line included in the binary image;

extracting straight-line linear vector candidates from the binary image; and obtaining the 2D linear vector map by connecting the extracted straight-line linear vector candidates and converting to a linear vector.

13. The method of claim 12, wherein the simplifying comprises:

removing noise included in the 2D linear vector map;

simplifying polylines included in the 2D linear vector map with the noise removed, based on the traveling data; and correcting a room area included in the indoor space, based on the simplified 2D linear vector map.

14. The method of claim 13, wherein the removing of the noise comprises:

determining a line with a length of the line being less than or equal to a threshold value or a line with an irregularity being greater than or equal to the threshold value as noise from among a plurality of lines included in the 2D linear vector map.

15. The method of claim 13, wherein the simplifying comprises:

simplifying polylines included in the 2D linear vector map with the noise removed for an area traveled by a robot cleaner to be included as an indoor area, based on the traveling data.

16. The method of claim 13, wherein the simplifying comprises:

deleting an area that falls outside a boundary line included in the simplified 2D linear vector map from an existing room area from among room areas included in the indoor space; and adding an area which is not included as the room area despite being within the boundary line included in the simplified 2D linear vector map as a new room area.

17. The method of claim 13, wherein the simplifying comprises:

display a user interface (UI) asking a user about performing simplification during a simplification process on a display of the electronic device.

18. The method of claim 11, further comprising:

adjusting a degree of simplification of the 2D map, based on a user input or obstacle information obtained from the sensing data.

19. One or more non-transitory computer-readable storage media storing one or more computer programs including computer-executable instructions that, when executed by one or more processors of an electronic device, cause the electronic device to perform operations, the operations comprising:

obtaining a 2-dimensional (2D) map of an indoor space generated based on sensing data, and traveling data obtained by at least one external device;

simplifying the obtained 2D map, based on the traveling data; and generating a 3-dimensional (3D) map, based on the simplified 2D map, wherein the obtaining of the 2D map comprises:

obtaining a 2D grid map based on the sensing data, obtaining a binary image based on information on obstacles included in the 2D grid map, and obtaining, as the 2D map, a 2D linear vector map based on the binary image.

20. The one or more non-transitory computer-readable storage media of claim 19, wherein to obtain the 2D map the operations further comprise:

performing a thinning process of uniformly converting a thickness of a line included in the binary image;

extracting straight-line linear vector candidates from the binary image; and obtaining the 2D linear vector map by connecting the extracted straight-line linear vector candidates and converting to a linear vector.

* * * * *